United States Patent
Kanai et al.

(10) Patent No.: US 7,808,549 B2
(45) Date of Patent: Oct. 5, 2010

(54) ELECTRONIC DEVICE

(75) Inventors: Hideyuki Kanai, Kanagawa-ken (JP); Takeshi Yamasaki, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 967 days.

(21) Appl. No.: 10/568,609

(22) PCT Filed: Aug. 18, 2004

(86) PCT No.: PCT/JP2004/012145
§ 371 (c)(1), (2), (4) Date: Nov. 28, 2006

(87) PCT Pub. No.: WO2005/020046
PCT Pub. Date: Mar. 3, 2005

(65) Prior Publication Data
US 2007/0164923 A1     Jul. 19, 2007

(30) Foreign Application Priority Data
Aug. 21, 2003  (JP) .............................. 2003-297366
Nov. 7, 2003   (JP) .............................. 2003-377823

(51) Int. Cl.
   *H04N 5/225* (2006.01)
(52) U.S. Cl. ................. 348/373; 348/374; 348/375; 348/376
(58) Field of Classification Search ............... 348/373, 348/374, 375, 376; 455/575.1, 575.2, 575.3, 455/575.4
See application file for complete search history.

(56) References Cited

U.S. PATENT DOCUMENTS

| | | | | |
|---|---|---|---|---|
| 5,414,444 A | * | 5/1995 | Britz | ........................ 345/156 |
| 7,170,468 B2 | * | 1/2007 | Knopf | ........................ 345/1.3 |

* cited by examiner

Primary Examiner—Yogesh K Aggarwal
(74) Attorney, Agent, or Firm—Brinks Hofer Gilson & Lione

(57) ABSTRACT

An electronic device is provided that has excellent portability because it can be folded to a compact size at coupling means. In addition, a first display portion of a first display unit and a second display portion of a second display unit can form a single, large-screen display portion when the first display unit is rotated 90° clockwise and the second display unit is rotated 90° counterclockwise.

16 Claims, 18 Drawing Sheets

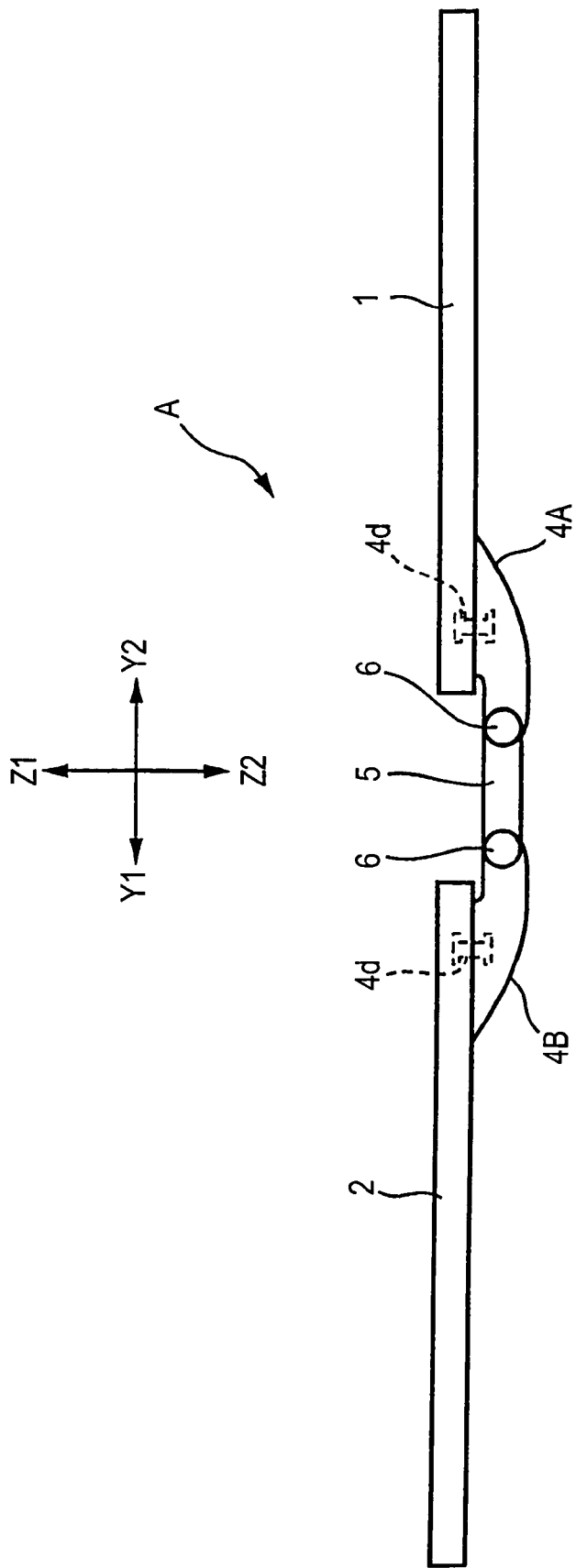

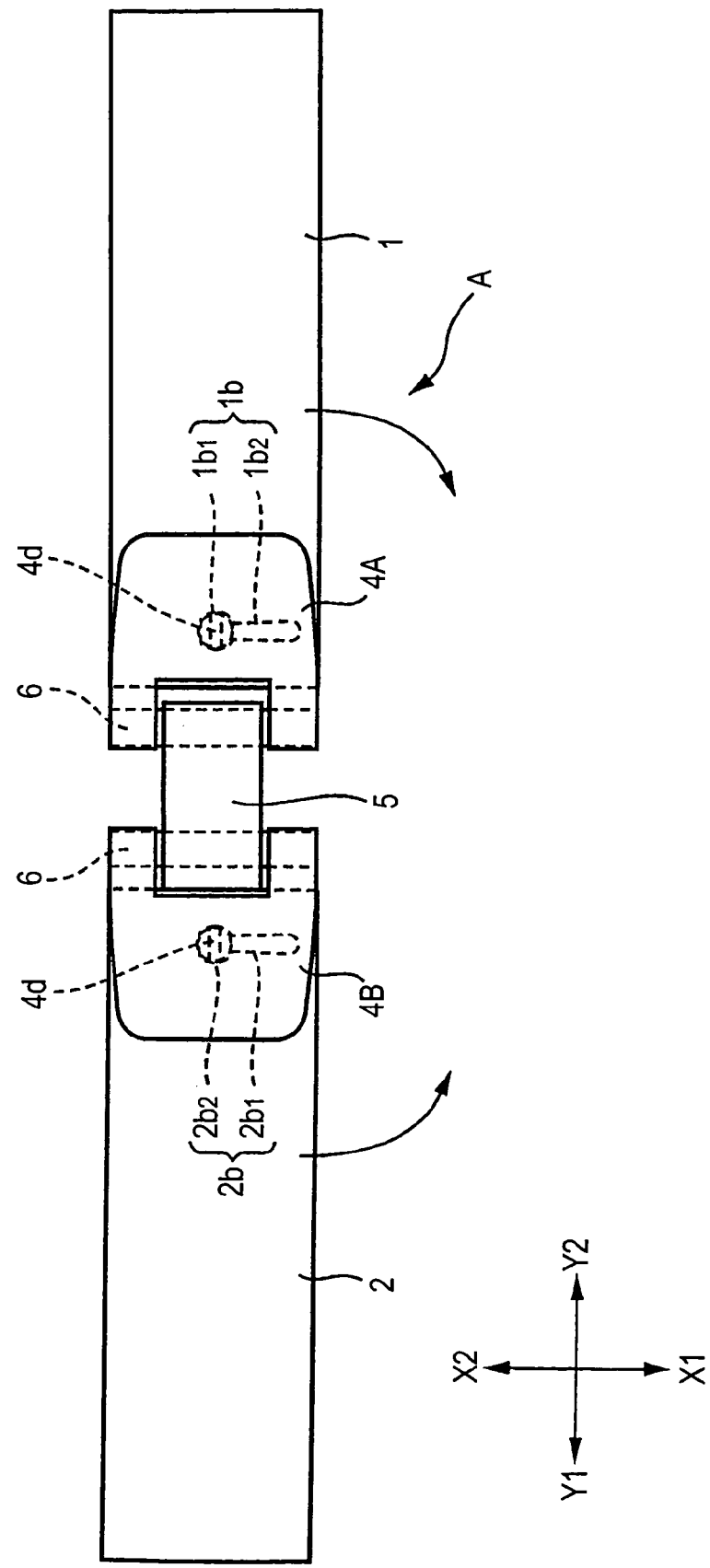

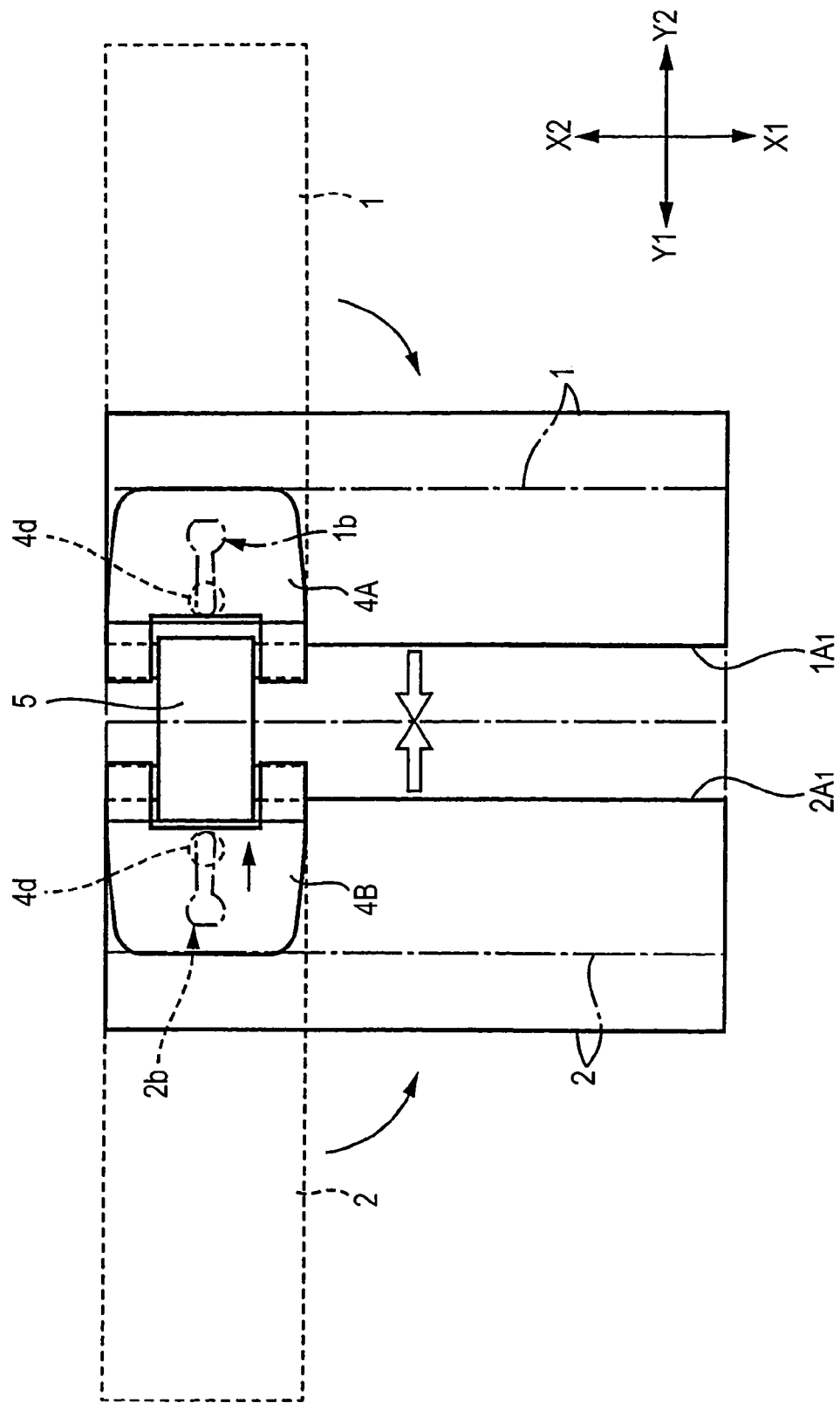

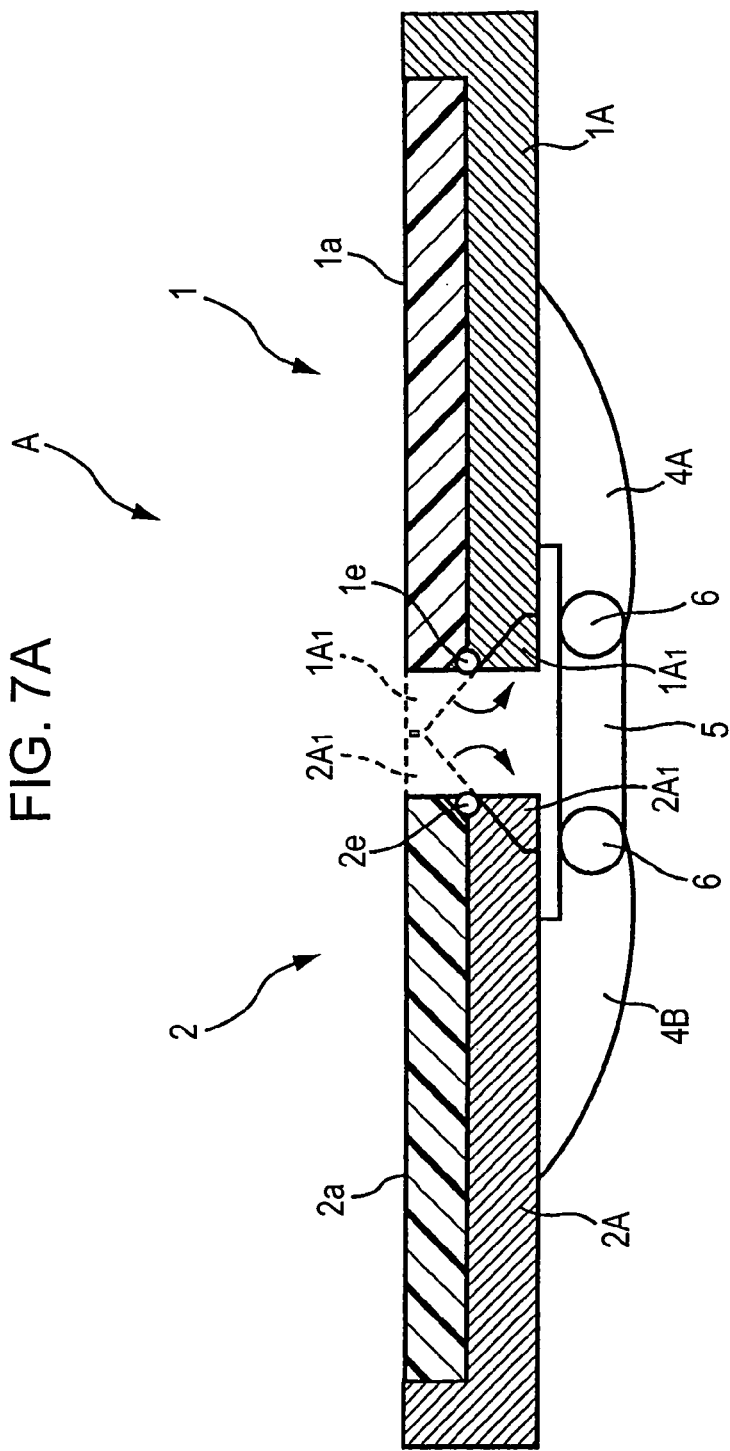
FIG. 7A
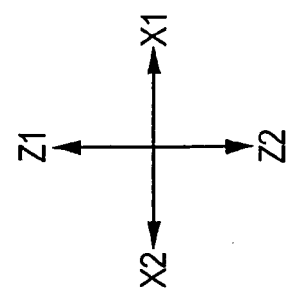

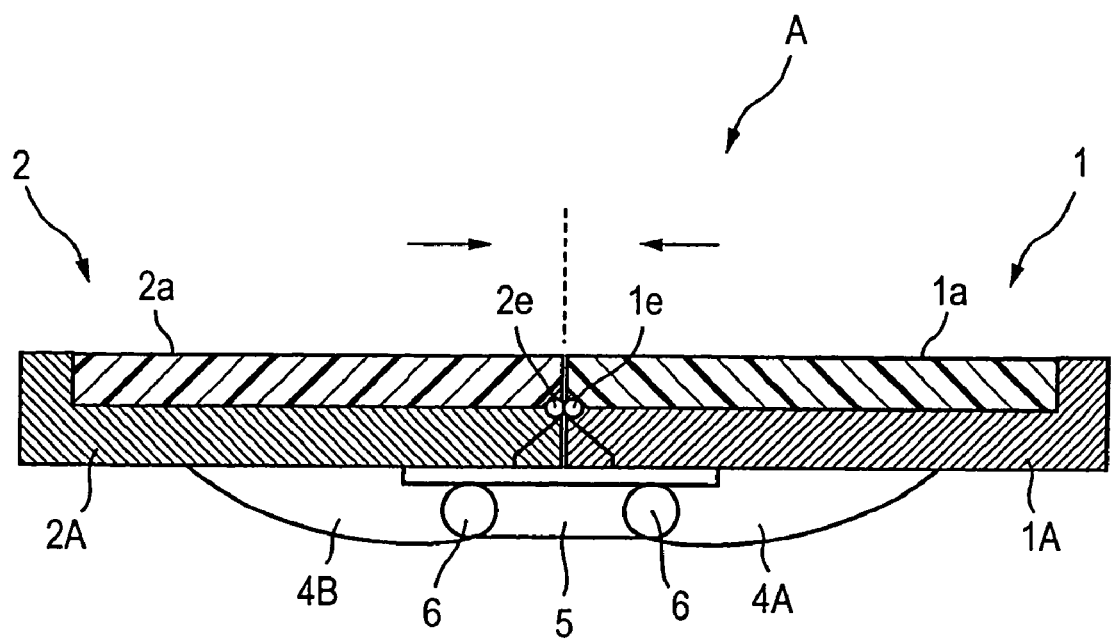
FIG. 7B
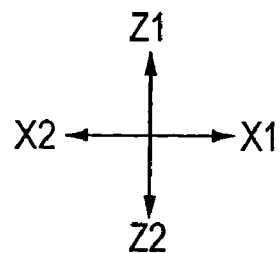

ELECTRONIC DEVICE

This application is the national stage application of International Application No. PCT/JP2004/012145 filed on Aug. 18, 2004, which claims priority to Japanese Patent Application Nos. 2003-297366 filed on Aug. 21, 2003 and 2003-377823 filed on Nov. 7, 2003, all of which are herein incorporated by reference.

TECHNICAL FIELD

The present invention relates to electronic devices having, for example, a TFT display, and particularly to an electronic device having excellent portability and including a display that can provide a large screen.

BACKGROUND ART

Electronic devices known as information terminals, typically cellular phones and personal digital assistants (PDAs), generally have an operating part for inputting and transmitting/receiving data information and a screen display portion for displaying the data information as characters or images.

A small-screen display portion is preferred in view of the portability of the electronic devices while a larger-screen display portion is preferred in view of the ease with which the content displayed can be viewed.

Recently, electronic devices with various functions, including a phone function and receiver functions for email, the Internet, and television broadcasting, have been devised. Accordingly, there is an increasing need for providing both the convenience of being small (portability) and the display of larger screens and screens with different sizes.

Examples of known electronic devices produced with consideration for portability and the size of a screen display portion are disclosed in Patent Documents 1 and 2 described below.

According to a technique disclosed in Japanese Unexamined Patent Application Publication No. 8-194590, a portrait-oriented screen display portion can be selectively used in either portrait or landscape orientation, and the touch panel area of the screen changes depending on whether the screen is portrait-oriented or landscape-oriented.

According to a technique disclosed in Japanese Unexamined Patent Application Publication No. 2000-184026, left and right halves of a device that opens laterally have separate screen display portions which are combined to form a single, large-screen display portion when they are opened laterally.

According to the technique disclosed in Patent Document 1, the screen display portion can be provided on a cellular phone with its portability maintained. The screen display portion, however, cannot provide a large screen because its own size is fixed and the size of image displayed changes depending on whether the screen is portrait-oriented or landscape-oriented. If, on the other hand, the screen display portion is provided with a large screen in advance, it cannot provide sufficient portability.

According to the technique disclosed in Patent Document 2, on the other hand, the single, large-screen display portion composed of the left and right separate portions has good visibility when used as a screen display portion for television or the Internet.

This device, however, has the drawback of poor usability because it opens laterally, rather than longitudinally. When the device is closed and held in one hand, for example, the device is difficult to open laterally while firmly holding it in only one hand because of the structure of a human hand.

If, additionally, the device is used as a cellular phone, the device cannot be held using the back of the hand, unlike devices that open longitudinally. Unfortunately, therefore, an operating part provided on either left or right surface of the device is difficult to operate quickly with only the thumb.

DISCLOSURE OF INVENTION

An object of the present invention, which has been created in order to solve the above problems in the background art, is to provide an electronic device having portability and usability comparable to cellular phones and including a display that can provide a large-screen display portion comparable to liquid crystal television receivers and PDAs.

(1) First Electronic Device

A first electronic device according to the present invention includes a display including a first display unit having a first display portion, a second display unit having a second display portion, and coupling means, provided between the first and second display units, for freely changing the mode of the display among a first mode in which the first and second display portions are folded so as to face each other, a second mode in which the first and second display units are opened such that the first and second display portions are arranged longitudinally, and a third mode in which the first and second display units are opened such that the first and second display portions are adjacent to each other laterally.

The electronic device including the display according to the present invention has excellent portability because the two display units can be folded. In addition, the electronic device has excellent usability because it can be folded longitudinally in a similar manner as known cellular phones. Furthermore, the screen display portions of the display units can be combined into a single, large-screen display portion with excellent visibility.

The electronic device according to the present invention may be configured such that, for example, the coupling means includes one or two coupling shafts for folding the coupling means in two or three and rotating shafts are provided between the coupling means and the first display unit and between the coupling means and the second display unit to support the first and second display units rotatably with respect to the coupling means.

For example, planes containing the axes of either the coupling shafts or the rotating shafts may be perpendicular to the axes of the other shafts.

The electronic device having above structure can readily be changed from one mode to another among the first to third modes.

In addition, the electronic device may be configured such that the rotating shafts are provided on either the coupling means or the first and second display units and holding holes for holding the rotating shafts are provided on the other.

In the above structure, preferably, the rotating shafts each have a narrow main portion and a wide portion integrally formed with an end of the narrow portion, and the holding holes each have a rotation-permitting portion that permits the rotation of the narrow portion and an elongated hole portion integrally formed with the rotation-permitting portion to permit the sliding movement of the narrow portion.

The above structure, in which the rotation-permitting portion and the wide portion are integrally formed, allows the display units not only to rotate, but also to slide in a predetermined direction.

In addition, at least one of the first and second display portions preferably includes a transparent touch panel.

When, for example, the electronic device is used as a cellular phone, the above means enables the use of the display portion including the transparent touch panel as an operating part and the other display portion including no transparent touch panel as a screen display portion. If, additionally, the display units each include the transparent touch panel, the overall screens can be used as an operating part.

In addition, the first and second display units preferably each include an RF unit for communicating data information therebetween using a radio wave.

The above means can eliminate the need for providing a wiring cable between the first and second display units to simplify the internal structure.

In addition, preferably, the peripheries of the first and second display portions are protected by frames, the inner edges of the frames, which are adjacent to each other in the third mode, are supported rotatably with respect to the frames, and the first and second display portions form a single display portion with the inner edges rotated.

The above means can prevent parts of the frames from appearing in the center of the screens to provide a large-screen display portion with higher visibility.

(2) Second Electronic Device

A second electronic device according to the present invention includes a first rectangular casing including a first display portion, a second rectangular casing including a second display portion, first securing means for securing the first and second casings with predetermined short sides thereof being in contact with each other, and second securing means for securing the first and second casings with predetermined long sides thereof being in contact with each other.

Thus, in the present invention, the overall form of the electronic device and the forms of the individual display portions are portrait-oriented when the first securing means secures the predetermined short sides of the first and second casings. Such forms are suitable for a cellular phone mode; for example, the first display portion may be used as a screen display portion for utilizing, for example, characters, and the second display portion may be used as an input part, that is, as a screen display portion for input operation. The display portions can thus be used with no dead area (area that does not contribute to screen display) to provide a portrait-oriented screen for the cellular phone mode.

The overall form of the electronic device can also be landscape-oriented when the second securing means secures the predetermined long sides of the second and second casings. In addition, the first and second display portions can be combined to form a landscape-oriented large-screen display portion. In this case, the landscape-oriented screen display portion can be prevented from being excessively long by suitably adjusting the ratio between the long and short sides of the first display portion and the ratio between the long and short sides of the second display portion. The large-screen display portion composed of the first and second display portions is therefore suitable as a screen display portion for a television/Internet mode. Also, in this case, a landscape-oriented screen for the television/Internet mode can be provided with no dead area (area that does not contribute to screen display).

The electronic device according to the present invention further includes a first rotating portion for rotatably connecting the first and second casings. The first rotating portion accommodates wiring connecting electrical systems of the first and second casings. The first display portion of the first casing and the second display portion of the second casing are provided so that the display portions are arrangeable in the same plane. The first and second casings are relatively rotatable about the first rotating portion in a predetermined plane.

Thus, in the present invention, the first and second casings can be relatively rotated in the same plane with the wiring accommodated in the first rotating portion. The first rotating portion can therefore change the form of connection between the first and second casings while maintaining a good electrical connection therebetween. In addition, the first display portion of the first casing and the second display portion of the second casing are provided so that the display portions are arrangeable in the same plane. Accordingly, the first and second display portions can always be maintained in the same plane irrespective of the change in the form of connection between the first and second casings.

The electronic device according to the present invention has a cellular phone function and a television or Internet receiver function. A cellular phone is formed when the first securing means secures the predetermined short sides of the first and second casings, and a television or Internet receiver is formed when the second securing means secures the predetermined long sides of the first and second casings.

Thus, in the present invention, the first securing means connects the first and second casings such that the overall form is portrait-oriented to form a cellular phone. Accordingly, the first display portion can be used as a screen display portion suitable for the cellular phone mode. On the other hand, the second securing means connects the first and second casings such that the overall form is landscape-oriented to form a television or Internet receiver. The first and second display portions can then be combined to form a landscape-oriented large-screen display portion. That is, the electronic device can provide a screen with an aspect ratio suitable for the cellular phone mode and a screen with an aspect ratio suitable for the television or Internet mode.

In the present invention, the first and second casings have the same aspect ratio. The aspect ratio is 3:2 or 9:8.

Thus, in the present invention, the first securing means secures the first and second casings with the predetermined short sides thereof being in contact with each other in the cellular phone mode. The first display portion can then provide a portrait-oriented screen for utilizing, for example, characters with an aspect ratio of 3:2, which is suitable for the cellular phone mode. In the television/Internet mode, on the other hand, the second securing means secures the first and second casings with the predetermined long sides thereof being in contact with each other. The first and second display portions can then be combined to form a large-screen display portion which can have a landscape-oriented screen with an aspect ratio of 9:16, which is suitable for the television/Internet mode.

In the present invention, the second display portion of the second casing forms an input part when the electronic device is used as a cellular phone.

Thus, in the present invention, the screen of the second display portion, which forms an input part, can be operated to provide, for example, a desired call function in the cellular phone mode. In addition, the overall screen of the second display portion can be used as an input part to ensure a relatively large input area which can provide an excellent operation function.

The electronic device according to the present invention further includes a first protective plate for protecting the first display portion, a second rotating portion for attaching the first protective plate to the predetermined long side of the first casing rotatably with respect to the first casing, a second protective plate for protecting the second display portion, and a third rotating portion for attaching the second protective plate to the predetermined long side of the second casing rotatably with respect to the second casing.

Thus, in the present invention, the first and second protective plates extend from the predetermined long sides of the first and second casings, respectively, laterally in the cellular phone mode. Accordingly, an edge of the first display portion of the first casing is not exposed, and the first protective plate can protect the first display portion. Similarly, an edge of the second display portion of the second casing is not exposed, and the second protective plate can protect the second display portion.

In the television/Internet mode, on the other hand, the first and second casings are relatively rotated about the first rotating means with the first and second protective plates rotated about the second and third rotating portions, respectively, and the second securing means secures the first and second casings with the predetermined long sides thereof being in contact with each other. Accordingly, the edges of the first and second display portions of the first and second casings can be joined to form a single, large-screen display portion.

In the present invention, the first securing means includes first locking means for locking the first and second casings with the predetermined short sides thereof being in contact with each other, and the second securing means includes second locking means for locking the first and second casings with the predetermined long sides thereof being in contact with each other.

Thus, in the present invention, the first locking means locks the first and second casings with the predetermined short sides thereof being in contact with each other in the cellular phone mode such that the overall form of the first and second casings is portrait-oriented. This form is suitable as a cellular phone.

When the electronic device is used in the television/Internet mode, the first locking means is unlocked, and the second locking means is operated to lock the first and second casings with the predetermined long sides thereof being in contact with each other such that the overall form of the first and second casings is landscape-oriented. This form is suitable for television or the Internet.

When the electronic device is returned to the cellular phone mode, the second locking means is unlocked, and the first locking means is operated to lock the first and second casings with the predetermined short sides thereof being in contact with each other such that the overall form of the first and second casings is portrait-oriented. This form is suitable as a cellular phone.

Accordingly, the first locking means enables a stable form of cellular phone, and the second locking means enables a stable form of television or Internet receiver.

The electronic device according to the present invention further includes third locking means for locking the first protective plate such that the first protective plate extends from the first casing laterally and fourth locking means for locking the second protective plate such that the second protective plate extends from the second casing laterally.

Thus, in the present invention, the first and second protective plates are locked by operating the third and fourth locking means, respectively, in the cellular phone mode such that the first protective plate extends from the first casing laterally and the second protective plate extends from the second casing laterally. As a result, the edges of the first and second display portions of the first and second casings are stably protected by the first and second protective plates, respectively.

When the electronic device is used in the television/Internet mode, the first and second protective plates are rotated about the second and third rotating portions, respectively, with the third and fourth locking means unlocked. As a result, the first and second casings can be relatively rotated. A single large screen can then be formed by relatively rotating the first and second casings and joining the edges of the first and second display portions of the first and second casings.

The electronic device according to the present invention further includes a capacitive sensor disposed on the back surface of the second casing to output a signal related to the unlocking of the first and second locking means.

Thus, in the present invention, the first and second locking means are not unlocked when a human hand does not touch the capacitive sensor. This allows for the prevention of an accidental change of the overall form from the portrait-oriented form to the landscape-oriented form or from the landscape-oriented form to the portrait-oriented form.

The electronic device according to the present invention further includes an insulating band disposed on the back surface of the second casing to cover the capacitive sensor and secure a human hand inserted between the band and the second casing.

Thus, in the present invention, the band secures a human hand inserted between the back surface of the second casing and the band to maintain the overall device in a stable state. If, additionally, a conductor other than a hand is brought close to the capacitive sensor and is pressed against the band for some reason, the band can prevent the conductor from coming into contact with the capacitive sensor. That is, the band can prevent malfunctions.

(3) Third Electronic Device

A third electronic device according to the present invention includes a first casing including a first display portion and having adjacent short and long sides, a second casing including a second display portion and having adjacent short and long sides, first securing means for securing the first and second casings with short sides thereof being in contact with each other, and second securing means for securing the first and second casings with long sides thereof being in contact with each other.

The third electronic device according to the present invention can provide operations and effects similar to the second electronic device according to the present invention.

The first to third electronic devices according to the present invention are suitable as portable information terminals.

BRIEF DESCRIPTION OF THE DRAWINGS

FIG. 5A is a side view showing the second mode as in FIG. 1.

FIG. 5B is a back view showing the second mode as in FIG. 1.

FIG. 6B is a back view of the electronic device shown in FIG. 6A.

FIG. 7A is a sectional view illustrating the rotation of the inner edges of the display units.

FIG. 7B is a sectional view of the first and second display units brought close to each other.

BEST MODE FOR CARRYING OUT THE INVENTION

1. First Embodiment

Figure 1:
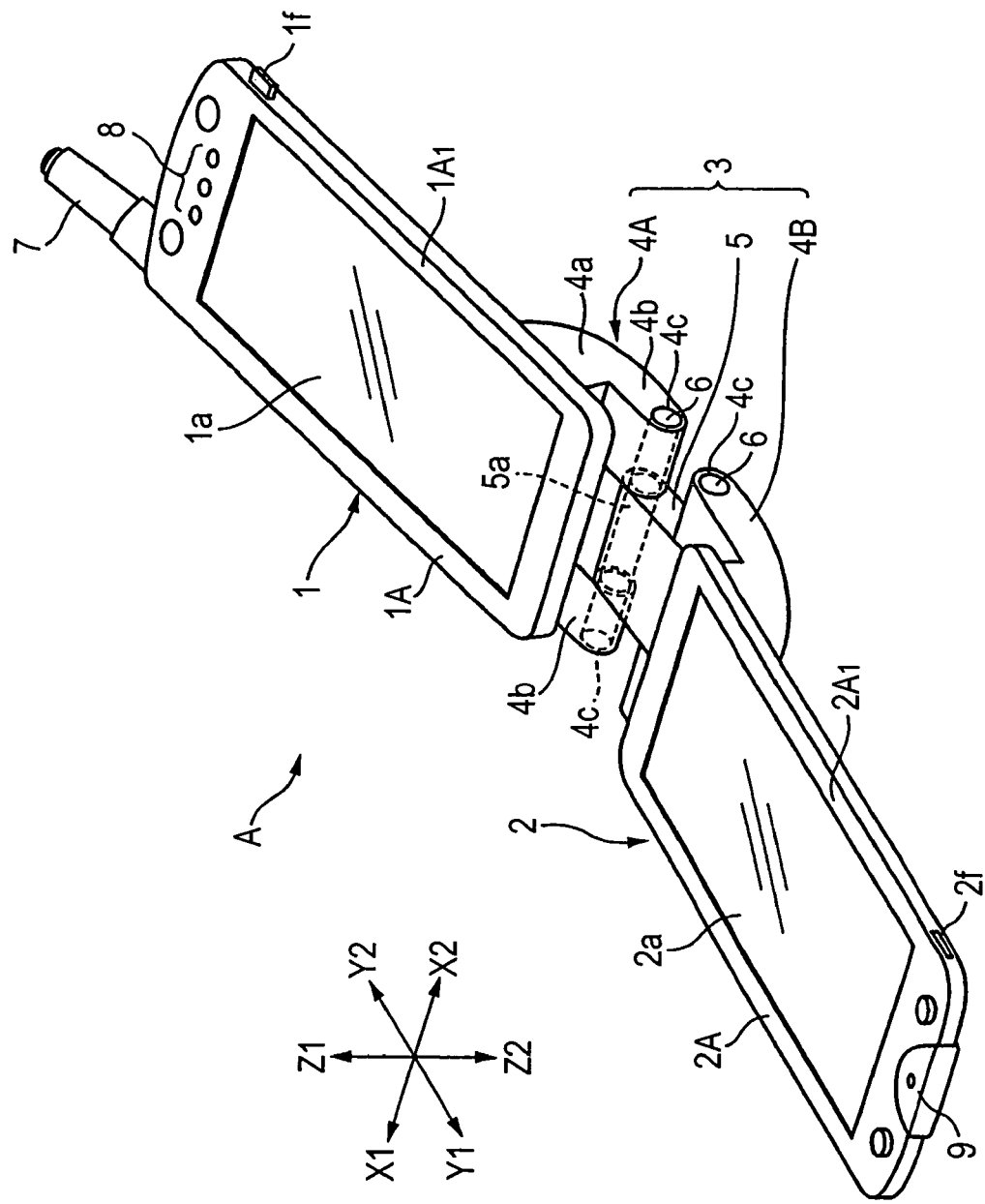
FIG. 1 is a perspective view of an electronic device according to a first embodiment of the present invention, showing a second mode in which display units of the electronic device are opened longitudinally.
Figure 2:
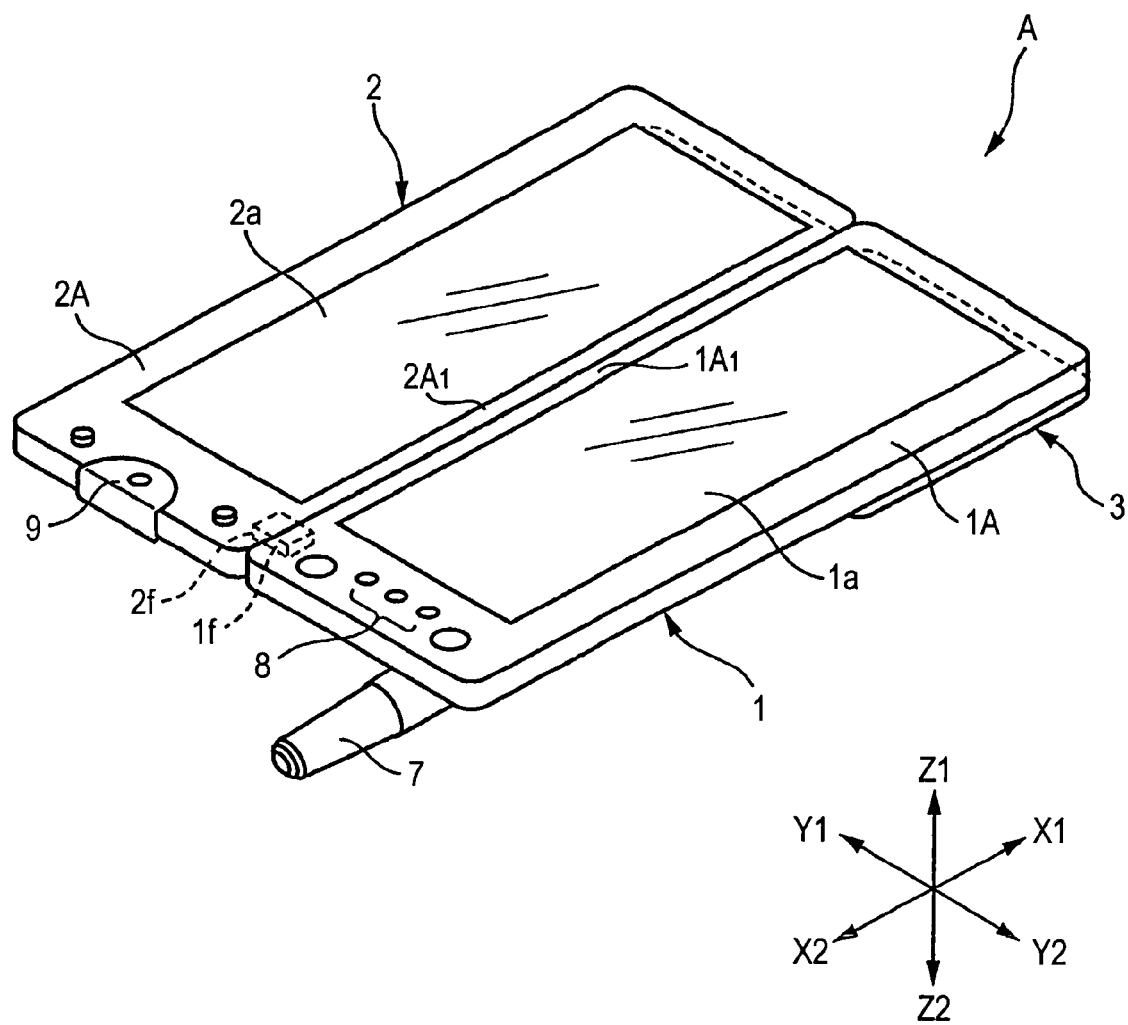
FIG. 2 is a perspective view of the electronic device in FIG. 1, showing a third mode in which the display units are opened laterally.
Figure 3:
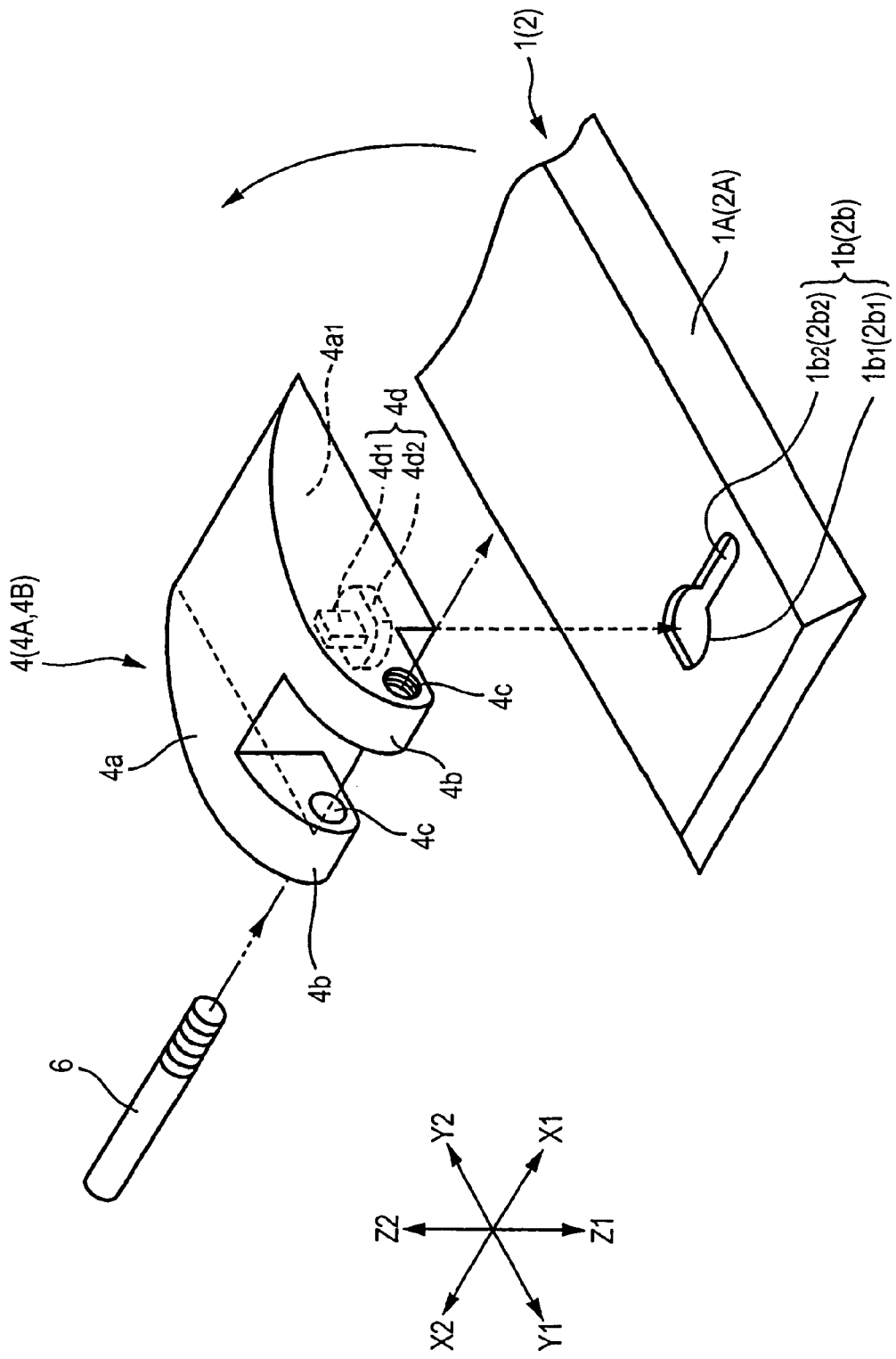
FIG. 3 is a partial enlarged view showing coupled portions of coupling means and the display units.
Figure 4:
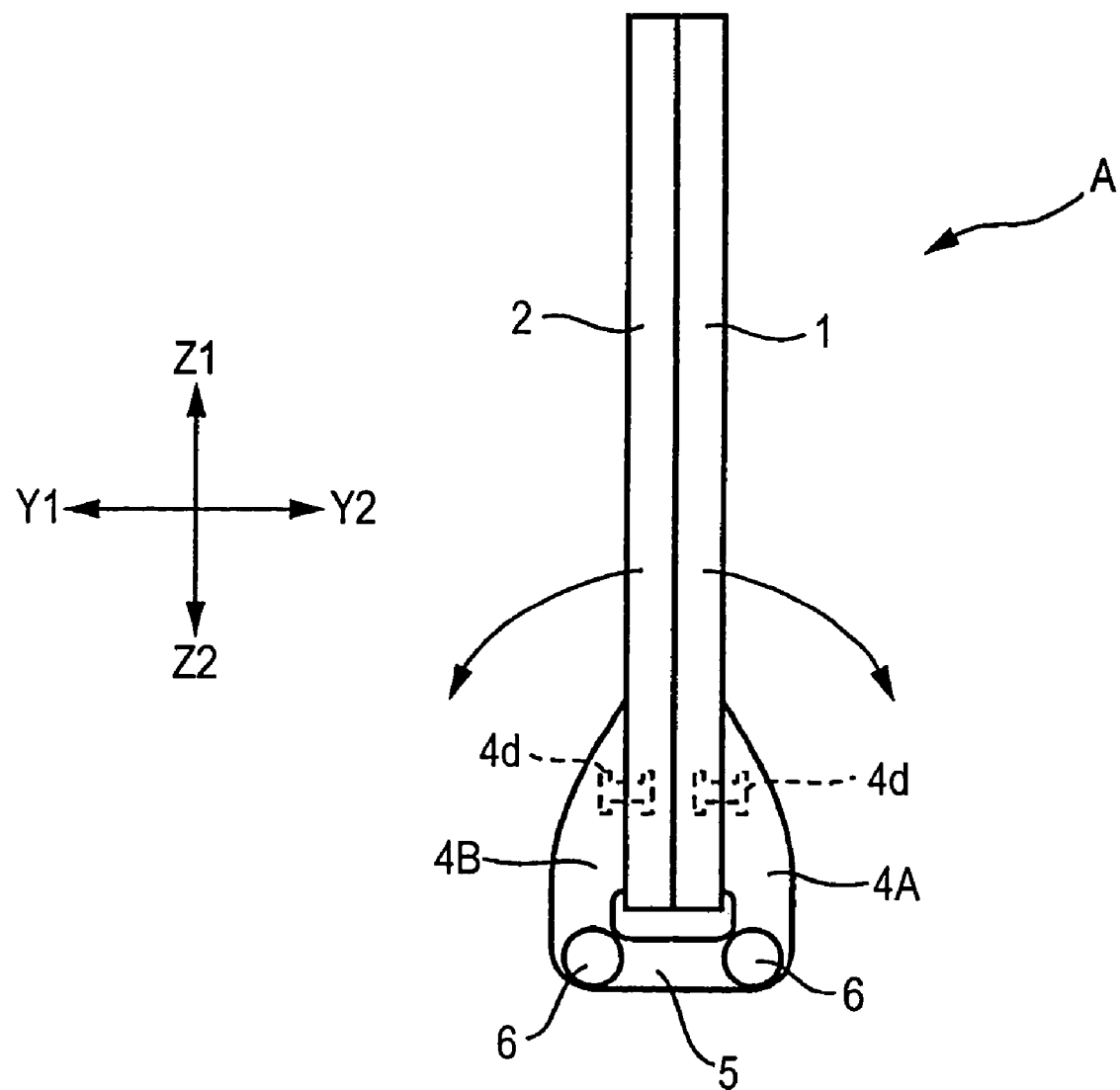
FIG. 4 is a side view showing a first mode in which the electronic device is closed.
Figure 6A:
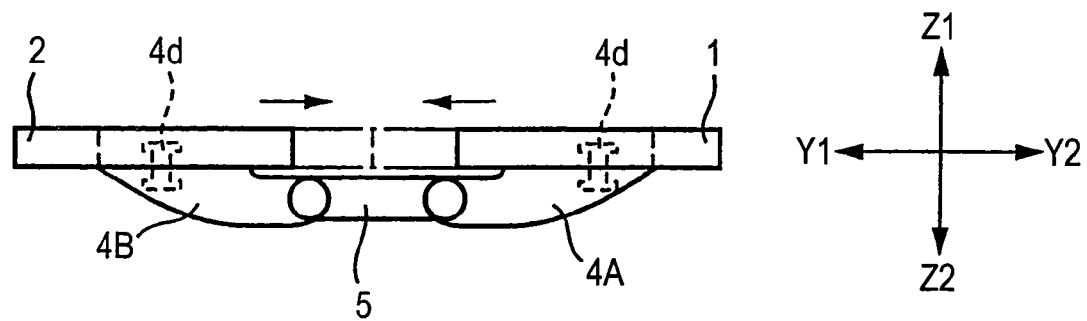
FIG. 6A is a side view showing the display units opened laterally after they are rotated.

FIG. 1 is a perspective view of an electronic device according to a first embodiment of the present invention, showing a second mode in which display units of the electronic device are opened longitudinally. FIG. 2 is a perspective view of the electronic device in FIG. 1, showing a third mode in which the display units are opened laterally. FIG. 3 is a partial enlarged view showing coupled portions of coupling means and the display units. FIGS. 4 to 6 illustrate how the electronic device is operated. FIG. 4 is a side view showing a first mode in which the electronic device is closed. FIG. 5A is a side view showing the second mode as in FIG. 1. FIG. 5B is a back view showing the second mode as in FIG. 1. FIG. 6A is a side view showing the display units opened laterally after they are rotated. FIG. 6B is a back view of the electronic device shown in FIG. 6A.

Referring to FIG. 1, an electronic device A according to the first embodiment mainly includes a first display unit 1 and a second display unit 2 which are coupled by coupling means 3.

The first and second display units 1 and 2 have outer frames (frames) 1A and 2A, respectively. The outer frames 1A and 2A are formed of, for example, a synthetic resin or a light metal, and have rectangular openings in the inner surfaces thereof. These openings have an aspect ratio of 4:3 or 16:9. The first and second display units 1 and 2 include a first display portion 1a and a second display portion 2a, respectively, disposed in the openings.

The first and second display portions 1a and 2a include display means (not shown) having an aspect ratio of 4:3 or 16:9 and a transparent cover provided over the display means. The transparent cover is formed of, for example, an acrylic resin. The display means is, for example, a super-twisted nematic (STN) or thin-film transistor (TFT) liquid crystal display or an organic EL display. At least the second display unit 2 has a transparent capacitive touch panel (not shown) disposed between the transparent cover and the display means. The transparent touch panel is formed with, for example, a transparent electrode (ITO). Use of the transparent touch panel allows, for example, various operations of the electronic device A, including character input. The transparent touch panel may also be provided in the first display unit 1.

The first display unit 1 further includes, for example, a communications antenna 7 and an earpiece speaker 8. The second display unit 2 further includes, for example, a mouthpiece microphone 9.

The coupling means 3 mainly includes a first coupling member 4A for supporting the back surface (the surface facing the Z2 direction) of the first display unit 1, a second coupling member 4B for supporting the back surface (the surface facing the Z2 direction) of the second display unit 2, and an intermediate coupling member 5 for coupling the first and second coupling members 4A and 4B. Note that the first and second coupling members 4A and 4B, which have the same structure, are described below as coupling members 4 unless otherwise specified.

In FIGS. 1 to 3, the coupling members 4 each include a base portion 4a and two parallel arm portions 4b protruding from the base portion 4a substantially in the Y direction. Throughholes 4c are formed so as to extend through the ends of the arm portions 4b in the X1 and X2 directions shown in the drawings.

Referring to FIG. 3, the coupling members 4 each have a rotating shaft 4d protruding from the bottom surface (the surface facing the Z1 direction shown in the drawing) 4a1 of the base portion 4a in the Z1 direction shown in the drawing. The rotating shaft 4d includes a narrow main portion 4d1 disposed adjacent to the bottom surface 4a1 in the center thereof and a wide portion 4d2 that is integrally formed with the end of the narrow portion 4d1 and is wider than the narrow portion 4d1. The surfaces of the narrow portion 4d1 shown in FIG. 3 are parallel to the YZ plane, which is defined by the Y and Z axes.

On the other hand, a holding hole 1b is formed in the back surface (the surface facing the Z2 direction shown in the drawing) of the outer frame 1A of the first display unit 1. This holding hole 1b has a rotation-permitting portion 1b1 composed of a substantially circular hole and an elongated hole portion 1b2 continuously extending from the rotation-permitting portion 1b1 in the X2 direction shown in the drawing. The elongated hole portion 1b2 is slightly wider than the narrow portion 4d1 of the rotating shaft 4d.

Similarly, a holding hole 2b having a rotation-permitting portion 2b1 and an elongated hole portion 2b2 is formed in the back surface (the surface facing the Z2 direction shown in the drawing) of the outer frame 2A of the second display unit 2.

In the structure shown in FIG. 3, the wide portion 4d2 of the rotating shaft 4d disposed on the first coupling member 4A has a part parallel to the Y axis which faces the X1 direction shown in the drawing, and the rotation-permitting portion 1b1 of the first display unit 1 has a part parallel to the Y axis which faces the X2 direction shown in the drawing. When, therefore, the first coupling member 4A or the first display unit 1 in FIG. 3 is rotated 180° about the rotating shaft 4d (the Z axis), the wide portion 4d2 of the first coupling member 4A can be aligned to the rotation-permitting portion 1b1 of the first display unit 1. The wide portion 4d2 can thus be inserted into the rotation-permitting portion 1b1 of the first display unit 1 at the aligned position to couple the first coupling member 4A with the first display unit 1. After the coupling, the first coupling member 4A and the first display unit 1 are misaligned by relatively rotating them about the rotating shaft 4d to prevent the detachment of the first coupling member 4A from the first display unit 1.

When the first coupling member 4A and the first display unit 1 are relatively rotated 90° from the aligned positions thereof, the narrow portion 4*d*1 can enter the elongated hole portion 1*b*2 and move therein in the Y2 direction shown in the drawing.

The second display unit 2 and the second coupling member 4B are coupled in the same manner as above.

The intermediate coupling member 5 has a rectangular shape, and cylindrical bearings 5*a* are formed at the ends thereof in the Y direction shown in the drawings. The bearings 5*a* are disposed between the arm portions 4*b* of the coupling members 4 to communicate with the through-holes 4*c* of the coupling members 4. Coupling shafts 6 are inserted into the bearings 5*a* and the through-holes 4*c* shown in FIG. 3. Thus the first and second coupling members 4A and 4B are rotatably coupled to the ends of the intermediate coupling member 5 with the coupling shafts 6.

A plane containing the axis of the coupling shaft 6 (the bottom surface 4*a*1 of the coupling member 4) is perpendicular to the axis of the rotating shaft 4*d* (see, for example, FIGS. 4 and 5).

Referring to FIG. 4, the first and second coupling members 4A and 4B are folded about the coupling shafts 6 so as to be substantially perpendicular to the intermediate coupling member 5. As a result, the electronic device A is set to the first mode (closed state), in which the first display portion 1*a* of the first display unit 1 and the second display portion 2*a* of the second display unit 2 are brought close to and face each other. In the first mode, the electronic device A can be folded into a compact form which is highly portable and is convenient for carrying.

Referring to FIGS. 5A and 5B, the first and second coupling members 4A and 4B are folded about the coupling shafts 6 so as to be substantially parallel to the intermediate coupling member 5. As a result, the electronic device A can be set to the second mode (open state), in which the first and second display units 1 and 2 are opened such that the first and second display portions 1*a* and 2*a* face the same direction (the Z1 direction). In this case, the first and second display units 1 and 2 are basically opened longitudinally (in the Y direction); therefore, the electronic device A can readily be changed from the first mode (see FIG. 4) to the second mode (see FIGS. 2 and 6B) with only one hand in a similar manner as known foldable cellular phones.

The electronic device A in the second mode can be used as a cellular phone because the earpiece speaker 8 on the first display unit 1 can be separated from the mouthpiece microphone 9 on the second display unit 2.

When the electronic device A is used as a cellular phone, the first display portion 1*a* of the first display unit 1 displays, for example, character information and images, and the second display portion 2*a* of the second display unit 2 displays, for example, an arrangement of numeric, alphabet, or kana keys. When a user operates the displayed area of the second display portion 2*a*, the transparent touch panel detects the operational information input by the user to display the information on the first display portion 1*a*. Thus the second display portion 2*a* allows the user to input data information to the electronic device A.

The first and second display units 1 and 2 in the second mode shown in FIGS. 5A and 5B are rotated substantially 90° about the rotating shafts 4*d* disposed in the rotation-permitting portions 1*b*1 and 2*b*1 in directions in which the first and second display units 1 and 2 approach each other. As a result, the first and second display units 1 and 2 can be arranged in parallel, as shown in FIGS. 6A and 6B.

The narrow portions 4*d*1 of the rotating shafts 4*d* of the first and second coupling members 4A and 4B, which support the first and second display units 1 and 2, are relatively rotated 90° in the rotation-permitting portions 1*b*1 of the holding holes 1*b*. This rotation allows the direction along the surfaces of the narrow portions 4*d*1 to agree with the direction in which the elongated hole portions 1*b*2 extend so that the narrow portions 4*d*1 can enter the elongated hole portions 1*b*2.

Referring to FIG. 6B, the first and second display units 1 and 2 are pushed in the directions indicated by the arrows so as to approach each other. The narrow portions 4*d*1 are then moved from the rotation-permitting portions 1*b*1 and 2*b*1 into the elongated hole portions 1*b*2 and 2*b*2, where the narrow portions 4*d*1 are movable. The first and second display units 1 and 2 are then slid from the positions indicated by the solid lines in FIGS. 6A and 6B to the positions indicated by the dotted-chain lines in the drawings (the positions at which the first and second display units 1 and 2 are close to each other). As a result, the electronic device A is set to the third mode (large-screen state), in which the first and second display portions 1*a* and 2*a* are adjacent to each other laterally and face the same direction (the Z1 direction) (see FIG. 2).

In the third mode, the first and second display portions 1*a* and 2*a* can be combined to form a single, large-screen display portion.

That is, a television or Internet image can be displayed on the first and second display portions 1*a* and 2*a* as a single image with double the size of images displayed on the individual display portions 1*a* and 2*a*. In this case, additionally, the display portions 1*a* and 2*a* have no dead area, that is, no unused display area, because the large-screen display portion can have a conventional aspect ratio, namely 4:3 or 16:9. The display portions 1*a* and 2*a* can therefore provide an easily viewable television or Internet image.

If the first and second display units 1 and 2 both include a transparent touch panel, data information can be input using the two display units 1 and 2. The electronic device A can then be used as, for example, a PDA.

In FIG. 1, locking means indicated by reference numerals 1*f* and 2*f* may be provided at the inner edge 1A1 of the outer frame 1A and the inner edge 2A1 of the outer frame 2A, which face each other in the third mode. The locking means can prevent the detachment of the first and second display units 1 and 2 from each other during use.

If, additionally, the locking means indicated by reference numeral 1*f* and 2*f* are connectors, the connectors not only can prevent the detachment of the first and second display units 1 and 2 from each other, but also can electrically connect circuit boards provided in the first and second display units 1 and 2. Accordingly, it is possible to detect that the electronic device A is set to the third mode by sensing that the connector 1*f* is connected to the connector 2*f*.

The third mode shown in FIG. 2 lacks visibility or usability because the inner edges 1A1 and 2A1 of the outer frames 1A and 2A are positioned in the center of the screens. Accordingly, the structure described below may be employed.

FIG. 7 illustrate the first and second display units adjacent to each other laterally. FIG. 7A is a sectional view illustrating the rotation of the inner edges of the two display units. FIG. 7B is a sectional view of the first and second display units brought close to each other.

In FIGS. 7A and 7B, a hinge member 1*e* is provided between the outer frame 1A and the inner edge 1A1, and another hinge member 2*e* is provided between the outer frame 2A and the inner edge 2A1. The inner edges 1A1 and 2A1 are rotated about the hinge members 1*e* and 2*e*, respectively, such that the inner edges 1A1 and 2A1 are separated from the edges of the first and second display portions 1*a* and 2*a*, respectively.

In FIG. 7A, the inner edge 1A1 on the first display unit 1 side is rotated counterclockwise from the position indicated by the dotted lines shown in the drawing to the position indicated by the solid lines shown in the drawing. On the other hand, the inner edge 2A1 on the second display unit 2 side is rotated clockwise from the position indicated by the dotted lines shown in the drawing to the position indicated by the solid lines shown in the drawing. As a result, the first and second display portions 1a and 2a are directly adjacent to each other, and the inner edges 1A1 and 2A1 do not appear in the center of the screens. In FIG. 7B, the first and second display units 1 and 2 can then be slid in the directions in which they approach each other to minimize the gap between the edges of the first and second display portions 1a and 2a, thus forming a more easily viewable screen display portion.

Data information can be communicated between the first and second display units 1 and 2 through, for example, a flexible cable provided in the first and second coupling members 4A and 4B and the intermediate coupling member 5 or, as described above, the connectors 1f and 2f provided on the sides of the first and second display portions 1a and 2a which face each other.

The data information may also be communicated through RF units provided in the first and second display units 1 and 2. Use of the RF units, which can transmit/receive feeble radio waves, can eliminate the need for the wiring cable and the connectors as described above to simplify the internal structure and external appearance of the electronic device A.

2. Second Embodiment

Figure 8A:
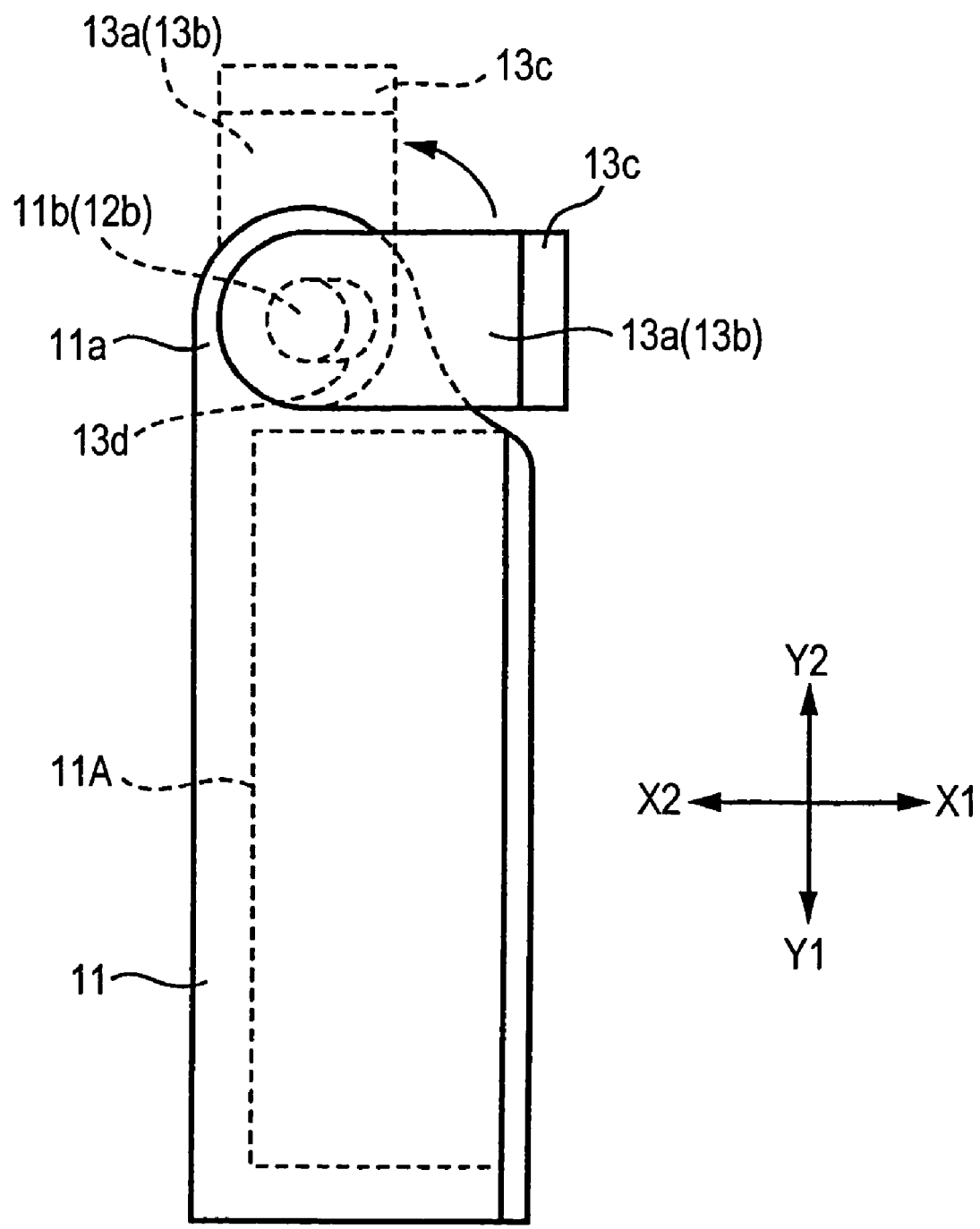
FIG. 8A is a plan view of an electronic device according to a second embodiment of the present invention, showing a first mode in which display units are folded so as to face each other.
Figure 8B:
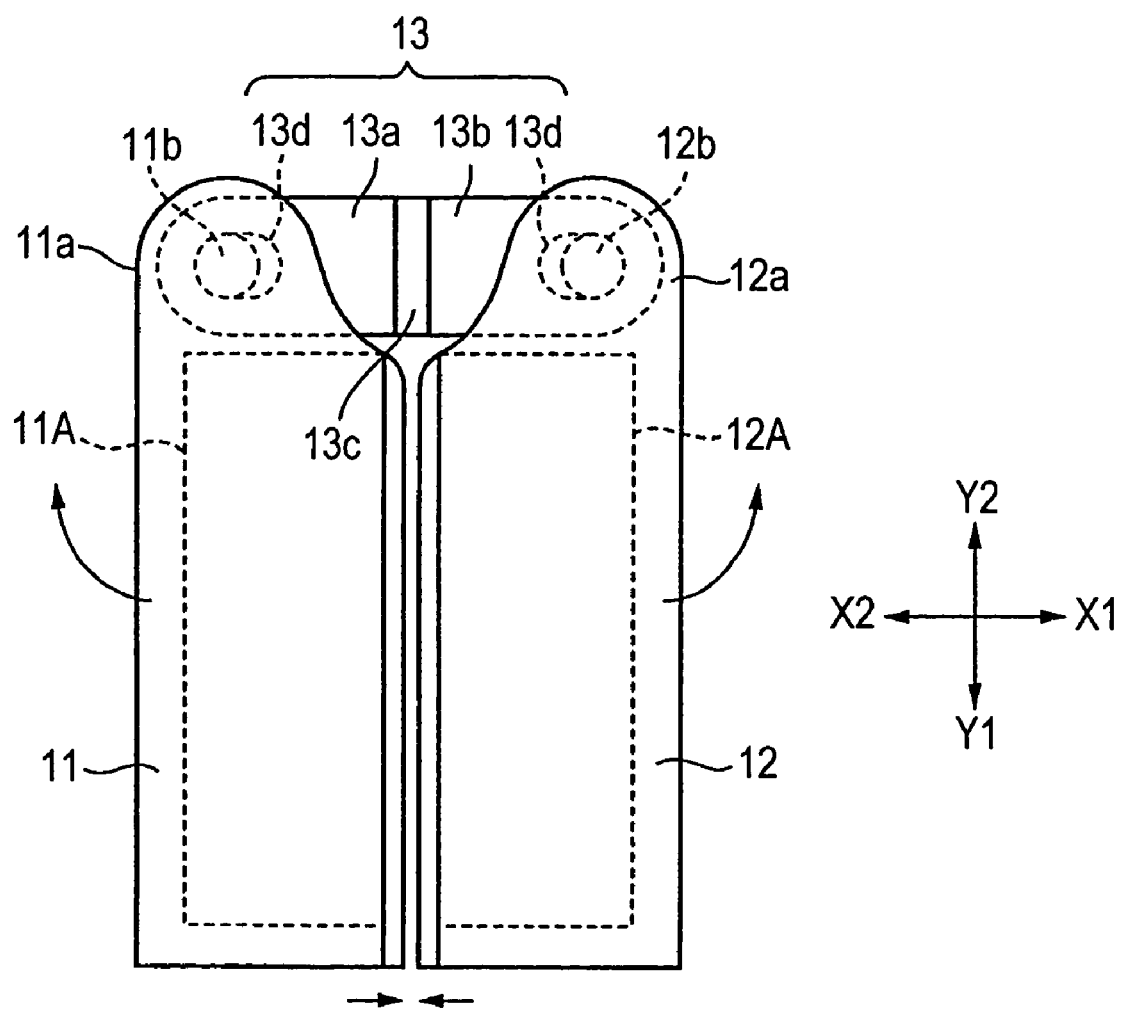
FIG. 8B is a plan view showing a third mode in which first and first display units are adjacent to each other laterally.
Figure 8C:
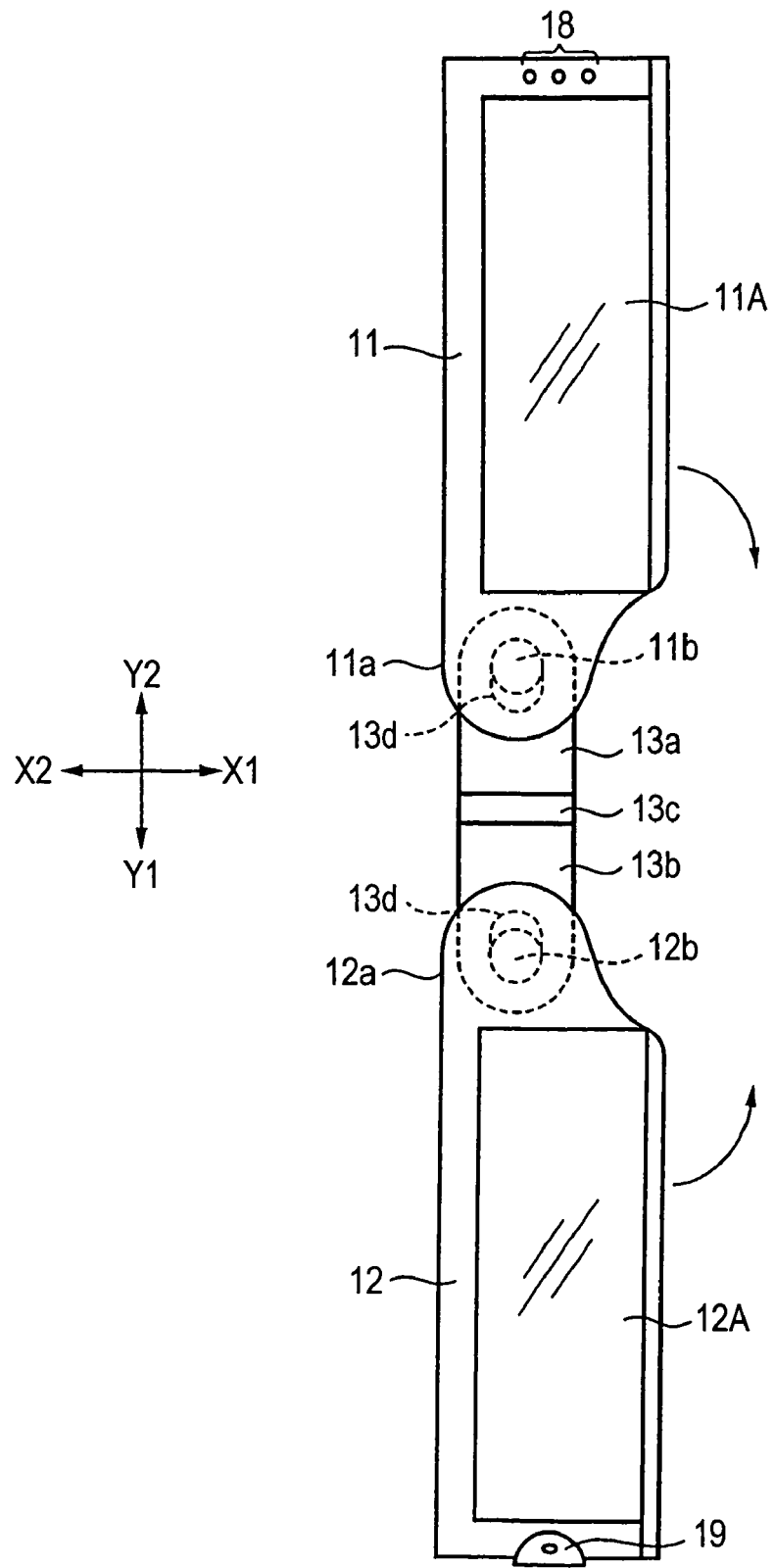
FIG. 8C is a plan view showing a second mode in which the display units are opened such that the first and second display portions are arranged longitudinally.

FIGS. 8A to 8C illustrate an electronic device according to a second embodiment of the present invention. FIG. 8A is a plan view showing a first mode in which display units are folded so as to face each other. FIG. 8B is a plan view showing a third mode (large-screen state) in which first and first display units are adjacent to each other laterally. FIG. 8C is a plan view showing a second mode (open state) in which the display units are opened such that the first and second display portions are arranged longitudinally. FIGS. 8A and 8B show the backside of the electronic device while FIG. 8C shows the display side of the electronic device.

An electronic device B shown in FIG. 8 mainly includes a first display unit 11, a second display unit 12, and coupling means 13. The first and second display units 11 and 12 have substantially the same internal structure as those in the first embodiment; therefore, differences from the first embodiment are mainly described below.

The first and second display units 11 and 12 are formed in a rectangular shape. A first display portion 11A is disposed in the center of the inner surface of the first display unit 11, and a second display portion 12A is disposed in the center of the inner surface of the second display unit 12.

A semicircular coupling portion 11a is provided at an end of the first display unit 11, and a semicircular coupling portion 12a is provided at an end of the second display unit 12. A rotating shaft 11b extends from the back surface of the coupling portion 11a perpendicularly to the back surface of the first display unit 11, and a rotating shaft 12b extends from the back surface of the coupling portion 12a perpendicularly to the back surface of the second display unit 12. An earpiece speaker 18 is disposed on the front surface of the other end of the first display unit 11, and a mouthpiece microphone 19 is disposed on the front surface of the other end of the second display unit 12 (see FIG. 8C).

The coupling means 13 includes a first coupling member 13a, a second coupling member 13b, and a coupling shaft 13c that rotatably couples the first and second coupling members 13a and 13b.

Elongated holes 13d extending along the length of the coupling means 13 are formed at the ends of the first and second coupling members 13a and 13b.

The coupling shaft 13c, which functions as a hinge, allows the first and second coupling members 13a and 13b to be folded in two and closed (see FIG. 8A) or to be opened substantially 180° from each other (see FIGS. 8B and 8C).

The rotating shafts 11b and 12b of the first and second display units 11 and 12 are inserted in the elongated holes 13d of the first and second coupling members 13a and 13b to allow the relative rotation of the first and second display units 11 and 12 and the first and second coupling members 13a and 13b about the rotating shafts 11b and 12b. In addition, the rotating shafts 11b and 12b can move in the elongated holes 13d.

The first and second display units 11 and 12 in the first mode shown in FIG. 8A are rotated about the coupling shaft 13c so that the display units 11 and 12 are substantially 180° from each other. As a result, the electronic device B can be set to the mode shown in FIG. 8B. In this state, as in the first embodiment, the rotating shafts 11b and 12b in the elongated holes 13d are brought close to each other in the directions indicated by the arrows. As a result, the electronic device B can be set to the third mode, in which the first and second display units 11 and 12 are adjacent to each other laterally.

The third mode, in which the first and second display portions 11A and 12B are adjacent to each other laterally, can provide a large-screen display portion, as in the first embodiment.

The display portions 11A and 12A in the third mode are separated by sliding them in the directions opposite the above directions. In FIG. 8B, the first display unit 11 is rotated clockwise about the rotating shaft 11b, and the second display unit 12 is rotated counterclockwise about the rotating shaft 12b. As a result, the electronic device B can be set to the second mode shown in FIG. 8C.

The electronic device B in the second mode can be used as a cellular phone, as in the first embodiment. The first and second display units 11 and 12 can then be rotated about the coupling shaft 13c to optimize the angle therebetween. That is, a user can readily position the microphone 19 of the second display unit 12 to his/her mouth with the speaker 18 positioned to his/her ear.

The electronic device B can also be set from the first mode shown in FIG. 8A to the second mode shown in FIG. 8C by rotating only the coupling means 13 to the position indicated by the dotted lines in FIG. 8A and then rotating the first and second display units 11 and 12 together about the coupling shaft 13c so that they are 180° from each other. In this case, basically, the first and second display units 11 and 12 are opened longitudinally (in the Y direction); therefore, the electronic device B can readily be changed from the first mode to the second mode with only one hand similarly to known foldable cellular phones. In addition, the operating part of the electronic device B can be operated with only one hand.

In FIG. 8C, the first display unit 11 in the second mode is rotated clockwise about the rotating shaft 11b, and the second display unit 12 is rotated counterclockwise about the rotating shaft 12b. As a result, the electronic device B can be set to the third mode shown in FIG. 8B.

In the second embodiment, as in the first embodiment, the elongated holes 13d preferably have a rotation-permitting portion and an elongated hole portion. In addition, the first and second display units 11 and 12 may accommodate RF units to allow the communication of data information using feeble radio waves through the RF units. Use of the RF units can eliminate the need for a wiring flexible cable for connecting the first and second display units 11 and 12.

As in the first embodiment, furthermore, the inner edges of the outer frames of the display portions 11A and 12B are preferably rotatable so as not to appear in the center of the screens in the third mode.

Though a PDA is shown as an example of the third mode in the above embodiments, the third mode is not limited to a PDA in the present invention; for example, the third mode may function as a computer or a monitor screen typified by a television receiver.

For the electronic device A according to the first embodiment, the two coupling shafts 6 allow the change between the first mode (closed state) and the second mode (open state), and the two rotating shafts 4b allow the change between the second mode (open state) and the third mode (large-screen state). For the electronic device B according to the second embodiment, on the other hand, the single coupling shaft 13c and the two rotating shafts 11b and 12b allow the change between the three modes. The present invention, however, is not limited to the above embodiments, and the change of mode may be performed with one coupling shaft and one rotating shaft.

3. Third Embodiment

A portable information terminal according to a preferred embodiment of the present invention will now be described with reference to the drawings.

Figure 9:
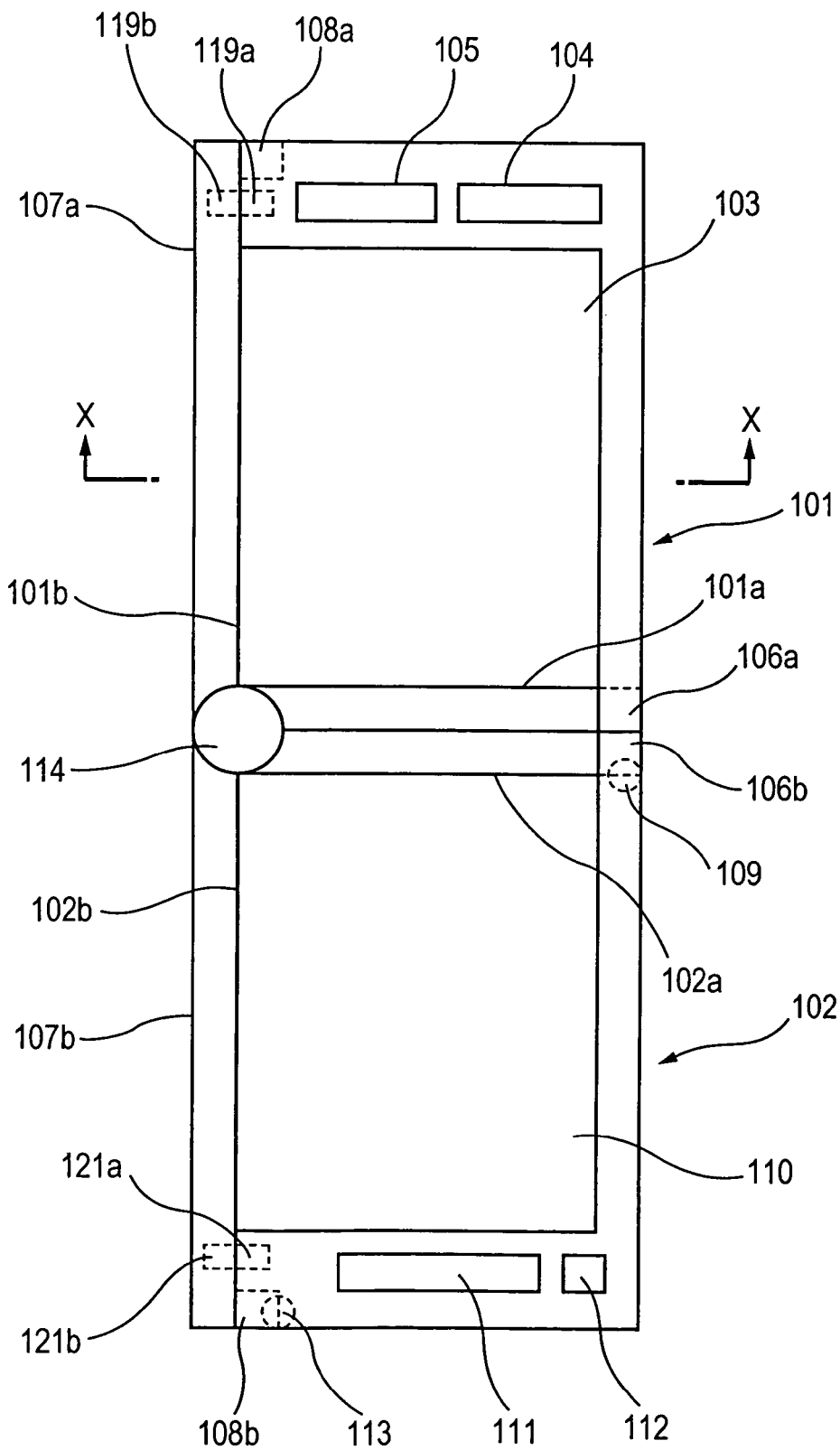
FIG. 9 is a front view of a portable information terminal according to an embodiment of the present invention, showing a form used as a cellular phone.
Figure 10:
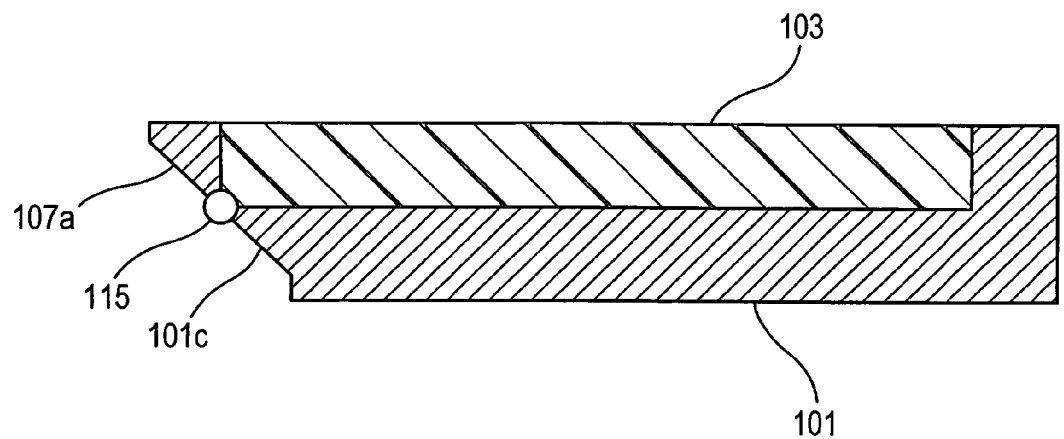
FIG. 10 is an enlarged sectional view taken along line X-X in FIG. 9.
Figure 11:
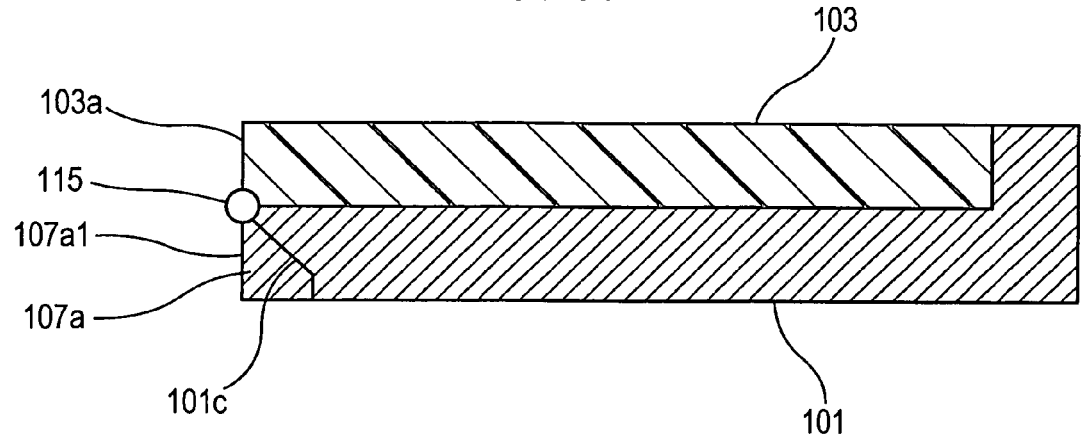
FIG. 11 is an enlarged sectional view showing the engagement of a first protective plate used in this embodiment.
Figure 12:
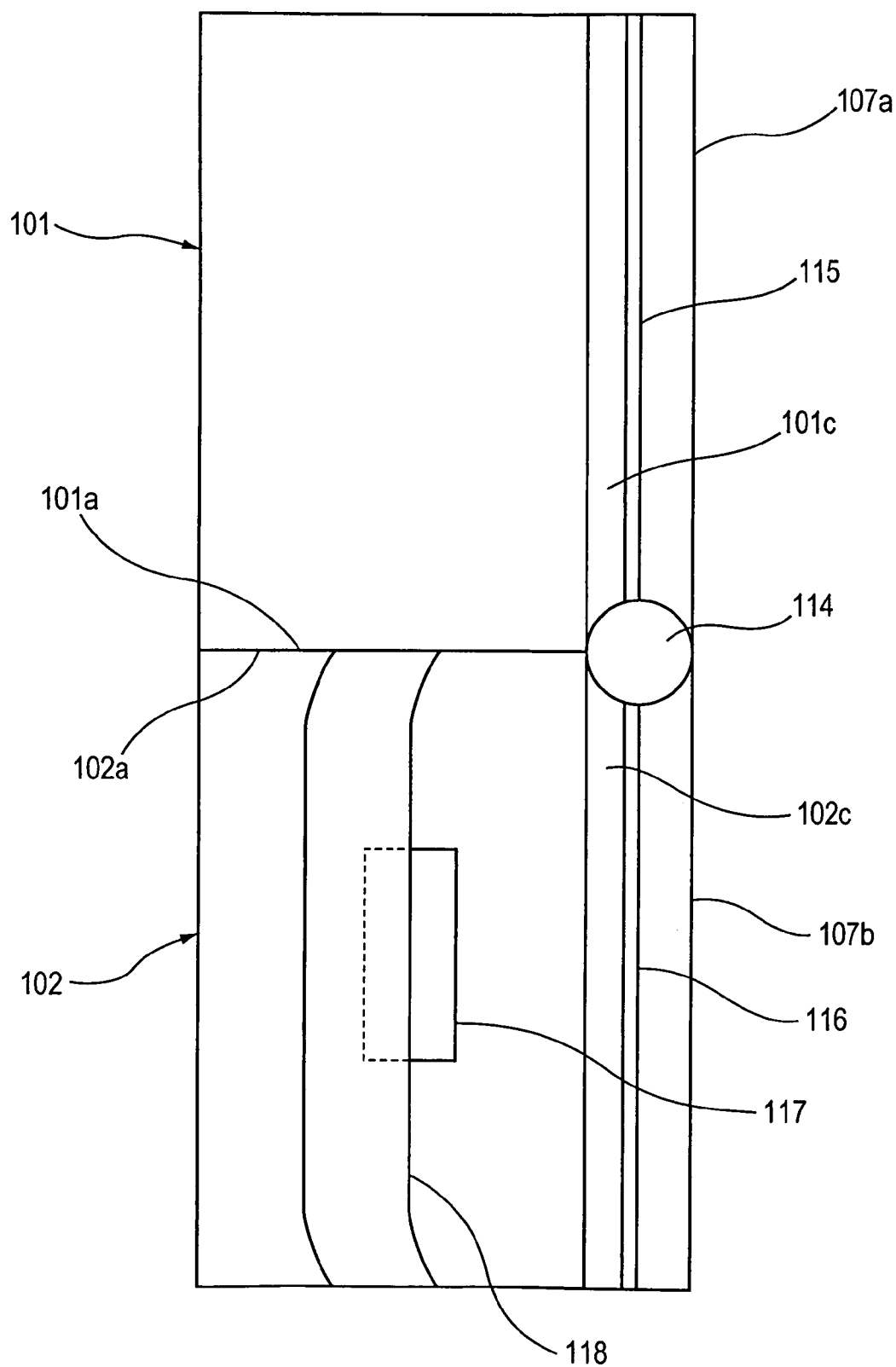
FIG. 12 is a back view showing the form used as a cellular phone in this embodiment.
Figure 13:
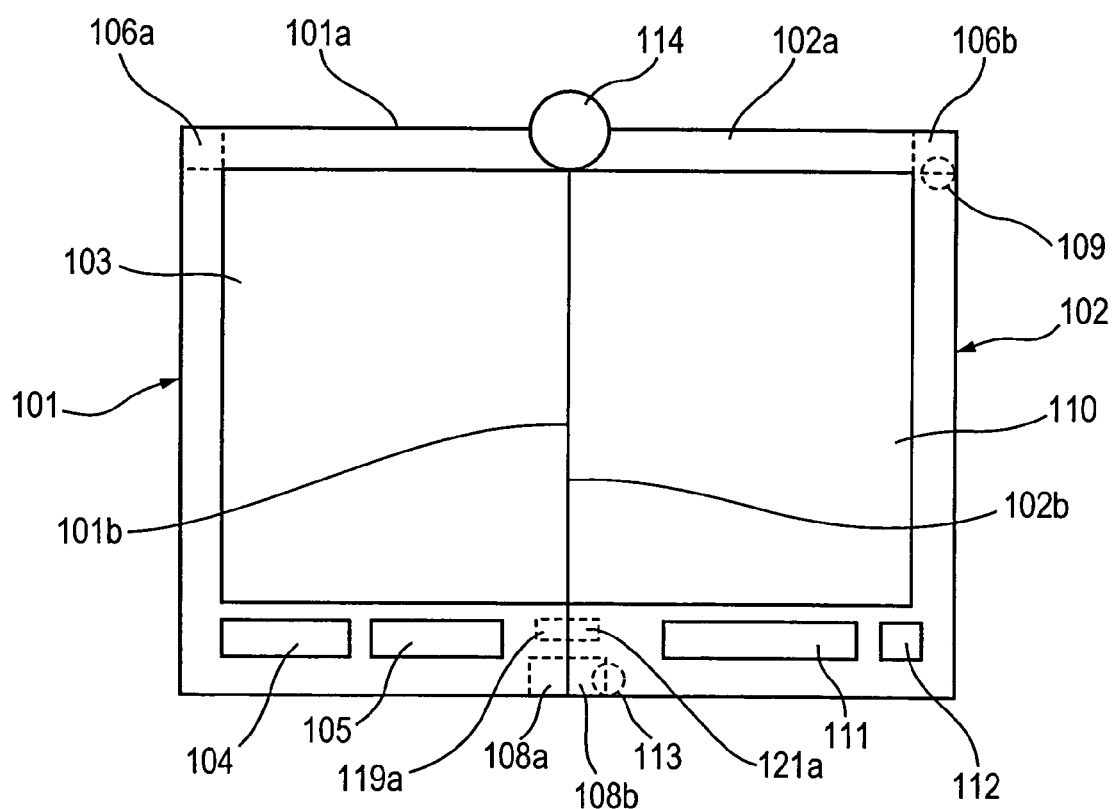
FIG. 13 is a front view showing a form used for television or the Internet in this embodiment.
Figure 14:
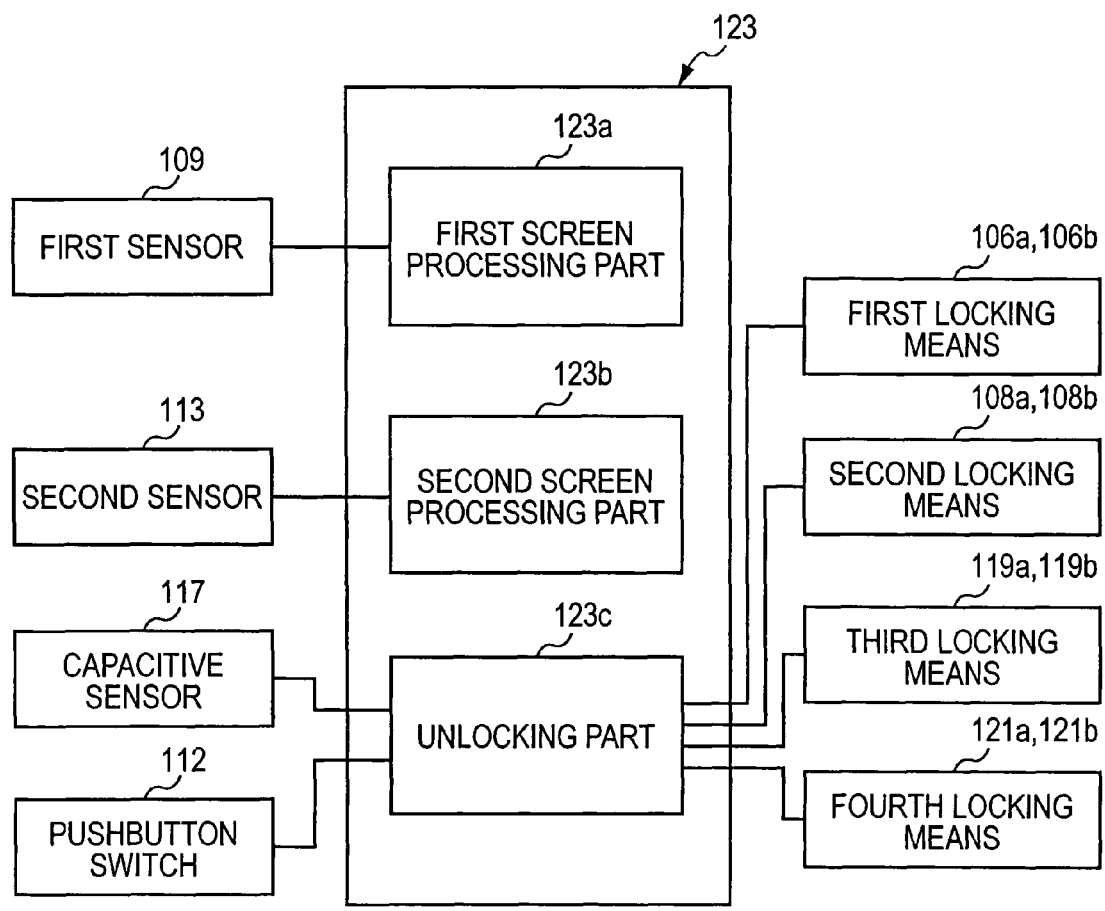
FIG. 14 is a block diagram showing the main part of a signal-processing system used in this embodiment.

FIGS. 9 to 14 illustrate the embodiment of the present invention. FIG. 9 is a front view showing a form used as a cellular phone. FIG. 10 is an enlarged sectional view taken along line A-A in FIG. 1. FIG. 11 is an enlarged sectional view showing the engagement of a first protective plate used in this embodiment. FIG. 12 is a back view showing the form used as a cellular phone. FIG. 13 is a front view showing a form used for television or the Internet. FIG. 14 is a block diagram showing the main part of a signal-processing system used in this embodiment.

Basic Structure in the Embodiment

Referring to FIG. 9, the portable information terminal according to this embodiment has a first casing 101 including a first display portion 3 and a second casing 102 including a second display portion 110. The display portions 103 and 110 are formed in a rectangular shape with substantially the same size. When the portable information terminal is used as a cellular phone, the first display portion 103 forms a liquid crystal screen capable of displaying, for example, characters, and the second display portion 110 forms an input part that allows input operations, namely, a liquid crystal touch panel. When the portable information terminal is used for television or the Internet, both display portions 103 and 110 form liquid crystal screens.

For example, the first and second casings 101 and 102 each have an aspect ratio (the ratio between the long sides and the short sides) of 3:2, and the first and second display portions 103 and 110 each have an aspect ratio of 3:2 accordingly.

The portable information terminal further has a first rotating portion 114 which rotatably couples the first and second casings 101 and 102. The first rotating portion 114 accommodates wiring connecting electric systems included in the first and second casing 101 and 102. The first and second display portions 103 and 110 of the first and second casings 101 and 102 are provided so that they can be arranged in the same plane. The first and second casings 101 and 102 can be relatively rotated about the first rotating portion 114 in a predetermined plane.

In this embodiment, particularly, the portable information terminal has first securing means for securing the first and second casings 101 and 102 with a predetermined short side 101a of the first casing 101 and a predetermined short side 102a of the second casing 102 being in contact with each other and second securing means for securing the first and second casings 101 and 102 with a predetermined long side 101b of the first casing 101 and a predetermined long side 102b of the second casing 102 being in contact with each other. The first securing means includes, for example, first locking means composed of electrical locking means, and the second securing means includes, for example, second locking means composed of electrical locking means.

The first locking means includes a first locking means component 106a disposed near the predetermined short side 101a of the first casing 101 and another first locking means component 106b disposed near the predetermined short side 102a of the second casing 102. The first locking means component 106b, for example, is provided with a first sensor 109 for detecting that the first and second casings 101 and 102 are locked with the predetermined short sides 106a and 106b being in contact with each other.

The second locking means includes a second locking means component 108a disposed near the predetermined long side 101b of the first casing 101 and another second locking means component 108b disposed near the predetermined long side 102b of the second casing 102. The second locking means component 108b, for example, is provided with a second sensor 13 for detecting that the first and second casings 101 and 102 are locked with the predetermined long sides 108a and 108b being in contact with each other.

A first protective plate 107a is attached to the predetermined long side 101b of the first casing 101 rotatably with respect to the first casing 101 with a second rotating portion 115 disposed therebetween, as shown in FIGS. 10 to 12. The first protective plate 107a is disposed along the predetermined long side 101b to protect an edge of the first display portion 103. Similarly, a second protective plate 107b is attached to the predetermined long side 102b of the second casing 102 rotatably with respect to the second casing 102 with a third rotating portion 116 disposed therebetween, as shown in FIG. 12. The second protective plate 107b is disposed along the predetermined long side 102b to protect an edge of the second display portion 110. As shown in FIG. 9, the first and second protective plates 107a and 107b, which can be independently rotated, are separated by the first rotating portion 114 and are arranged in series.

When, for example, the first protective plate 107a in FIG. 10 is rotated downward about the second rotating portion 115, the first protective plate 107a engages with an engaging portion 101c of the first casing 101, as shown in FIG. 11. As a result, for example, an end surface 103a of the first display portion 103 is flush with an end surface 107a1 of the first protective plate 107a which is formed after the engagement with the engaging portion 101c. Similarly, when the second protective plate 107b in FIG. 9 is rotated downward about the third rotating portion 116, the second protective plate 107b engages with an engaging portion 102c of the second casing 102 in FIG. 12.

As shown in FIGS. 9, 10, and 12, the portable information terminal further has third locking means for locking the first protective plate 107a such that the plate 107a extends from the first casing 101 laterally and fourth locking means for locking the second protective plate 107b such that the plate 107b extends from the second casing 102 laterally.

The third locking means is composed of, for example, electrical locking means. In FIG. 9, the third locking means includes a third locking means component 119a disposed on the first casing 101 side and another third locking means component 119b disposed on the first protective plate 107a side. Similarly, the fourth locking means is composed of, for example, electrical locking means, and includes a fourth locking means component 121a disposed on the second casing 102 side and another fourth locking means component 121b disposed on the second protective plate 107b side.

In FIG. 9, for example, the first casing 101 has a speaker 104 and a television/Internet operating part 105 utilized when the portable information terminal is used as a television or Internet receiver, and the second casing 102 has a microphone 111 and a pushbutton switch 112 for outputting a signal which directs the unlocking of the first to fourth locking means.

In FIG. 12, a capacitive sensor 117 for outputting a signal related to the unlocking of the first to fourth locking means is disposed on the back surface of the second casing 102. Also, an insulating band 118 is attached to the back surface of the second casing 102 to cover the capacitive sensor 117 and secure a human hand inserted between the band 118 and the second casing 102.

Structure of Signal-Processing System in the Embodiment

In this embodiment, for example, the second casing 102 includes control means 123 shown in FIG. 14. This control means 123 includes a first screen processing part 123a for setting the first display portion 103 of the first casing 101 as a cellular phone liquid crystal screen and the second display portion 110 of the second casing 102 as a cellular phone input part, that is, a liquid crystal touch panel, in response to a signal output from the first sensor 109, which detects the locking operation of the first locking means including the components 106a and 106b.

The control means 123 further includes a second screen processing part 123b for setting the first and second display portions 103 and 110 of the first and second casings 101 and 102 as liquid crystal screens for television or the Internet in response to a signal output from the second sensor 113, which detects the locking operation of the second locking means including the components 108a and 108b.

The control means 123 further includes an unlocking part 123c for outputting an unlocking command signal to appropriate locking means among the first to fourth locking means, for example all locking means, when the pushbutton switch 112 is pressed with a human hand being inserted to the band 118 shown in FIG. 12 and the capacitive sensor 117 being allowed to output a signal.

[Use in Cellular Phone Mode]

When the above portable information terminal is used as a cellular phone, the first and second casings 101 and 102 are connected in the form shown in FIG. 9. That is, the first locking means, which includes the components 106a and 106b, locks the first and second casings 101 and 102 with the predetermined short sides 101a and 102a being in contact with each other. In addition, the third locking means, which includes the components 119a and 119b, locks the first protective plate 107a to the first casing 101 such that the plate 107a extends from the predetermined long side 101b of the first casing 101, that is, the edge of the first display portion 103. Similarly, the fourth locking means, which includes the components 121a and 121b, locks the second protective plate 107b to the second casing 102 such that the plate 107b extends from the predetermined long side 102b of the second casing 102 laterally.

In this state, a phone call can be made through the microphone 111 and the speaker 104 by, for example, pressing a predetermined area of the second display portion 110 shown in FIG. 9, that is, a liquid crystal touch panel, with a human hand being inserted to the band 118 shown in FIG. 12. When characters are used, for example, an appropriate area of the liquid crystal touch panel is operated to display characters on the first display portion 103, namely a liquid crystal screen.

Thus, the portable information terminal can function as a cellular phone with the screen of the first display portion 103 maintained in a portrait orientation with an aspect ratio of 3:2.

[Change of Connection for Television/Internet Mode]

When the above cellular phone mode is changed for use as a television or Internet receiver, the pushbutton switch 112 shown in FIG. 9 is pressed with the human hand inserted to the band 118.

As a result, a signal output from the capacitive sensor 117 when it senses the human hand and a signal output from the pushbutton switch 112 are input to the unlocking part 123c of the control means 123 shown in FIG. 14. In response to these signals, the unlocking part 123c executes the output of an unlocking command signal to, for example, all the first to fourth locking means.

In response to the signal, the first locking means, which includes the components 106a and 106b, the third locking means, which includes the components 119a and 119b, and the fourth locking means, which includes the components 121a and 121b, are unlocked to allow the relative rotation of the first and second casings 101 and 102 and the rotation of the first and second protective plates 107a and 107b.

In this case, for example, the first protective plate 107a is rotated downward manually or under its own weight to engage with the engaging portion 101c of the first casing 101. Similarly, the second protective plate 107b is rotated downward manually or under its own weight to engage with the engaging portion 102c of the second casing 102. These operations expose the edge of the first display portion 103 which agrees with the predetermined long side 101b of the first casing 101 and the edge of the second display portion 110 which agrees with the predetermined long side 102b of the second casing 102.

The first casing 101 in FIG. 9, for example, is then manually rotated counterclockwise. Referring to FIG. 13, the second locking means component 108a engages with the second locking means component 108b with the edges of the first and second display portions 103 and 110, namely the predetermined long sides 101b and 102b of the first and second casings 101 and 102, being in contact with each other. Accordingly, the first and second casings 101 and 102 are locked by the second locking means.

The second sensor 113, as described above, detects the locking operation of the second locking means to output a signal. In response to the signal, the second screen processing part 123b shown in FIG. 14 sets the first and second display portions 103 and 110 of the first and second casings 101 and 102 as liquid crystal screens. After the process, the first and second display portions 103 and 110 are combined to form a relatively large screen for television or the Internet.

In this state, a video or still image corresponding to television signals or signals received through the Internet can be displayed on the combined liquid crystal screen of the first and second display portions 103 and 110 by operating the television/Internet operating part 5 shown in FIG. 13.

Thus, the portable information terminal can function as a television or Internet receiver with the combined screen of the first and second display portions 103 and 110 maintained in a landscape orientation with an aspect ratio of 3:4.

[Return to Cellular Phone Mode]

Conversely, when the above television/Internet receiver mode is changed for use as a cellular phone again, the pushbutton switch 112 shown in FIG. 9 is pressed with the human hand inserted to the band 118.

As a result, a signal output from the capacitive sensor 117 when it senses the human hand and a signal output from the pushbutton switch 112 are input to the unlocking part 123c of the control means 123 shown in FIG. 14. In response to these signals, the unlocking part 123c executes the output of an unlocking command signal to, for example, all the first to fourth locking means.

In response to the signal, the second locking means, which includes the components 108a and 108b, is unlocked to allow the relative rotation of the first and second casings 101 and 102.

The first casing 101 in FIG. 13, for example, is then manually rotated clockwise. Referring back to FIG. 9, the first locking means component 106a engages with the first locking means component 106b with the predetermined short sides 101a and 102a of the first and second casings 101 and 102 being in contact with each other. Accordingly, the first and second casings 101 and 102 are locked by the first locking means.

The first and second protective plates 107a and 107b are then manually rotated upward as shown in FIG. 10. The third locking means, which includes the components 119a and 119b, locks the first protective plate 107a such that the plate 107a extends from the first casing 101 laterally. The fourth locking means, which includes the components 121a and 121b, locks the second protective plate 107b such that the plate 107b extends from the second casing 102 laterally.

Thus, the portable information terminal can be returned to a portrait-oriented overall form for use as a cellular phone.

In the cellular phone mode, according to the embodiment described above, the first display portion 103 of the first casing 101 is set as a liquid crystal screen, and the second display portion 110 of the second casing 102 is set as an input part, namely a liquid crystal touch panel. In the television/Internet mode, on the other hand, the first and second display portions 103 and 110 are combined into a single, large liquid crystal screen. Accordingly, the display portions 103 and 110 have no dead area (area that does not contribute to screen display). In addition, the first display portion 103 can provide a portrait-oriented screen suitable as a cellular phone with an aspect ratio of 3:2, and the first and second display portions 103 and 110 can provide a combined landscape-oriented screen suitable for television and the Internet with an aspect ratio of 3:4. That is, two different screens with desired aspect ratios can readily be provided by relatively rotating the first and second casings 101 and 102.

In addition, the first and second casings 101 and 102 can be relatively rotated in the same plane with the wiring accommodated in the first rotating portion 114. The first rotating portion 114 can therefore change the form of connection between the first and second casings 101 and 102 while maintaining a good electrical connection therebetween, thus achieving a stable structure. Furthermore, the first and second display portions 103 and 110 of the first and second casings 101 and 102 are provided so that they can be arranged in the same plane. The form of connection can therefore be changed from the cellular phone mode to the television/Internet mode or from the television/Internet mode to the cellular phone mode while viewing both the first and second display portions 103 and 110. Accordingly, the form of connection of the display portions 103 and 110 can be easily changed.

In the cellular phone mode, additionally, a desired call function can be provided by operating the input part formed on the screen of the second display portion 110 of the second casing 102, namely a liquid crystal touch panel. Furthermore, the overall screen of the second display portion 110 can be set as the input part to ensure a relatively large input area which can provide an excellent operation function to contribute to the achievement of a cellular phone with higher precision.

In the cellular phone mode, additionally, the first protective plate 107a extends from the predetermined long side 101b of the first casing 101 laterally, and the second protective plate 107b extends from the predetermined long side 102b of the second casing 102 laterally. Accordingly, the edges of the first and second display portions 103 and 110 of the first and second casings 101 and 102 are not exposed, and the first and second protective plates 107a and 107b can protect the edges.

In addition, the first locking means, which includes the components 106a and 106b, can maintain a stable form of cellular phone, and the second locking means, which includes the components 108a and 108b, can maintain a stable form of television or Internet receiver. These locking means can therefore improve the reliability of the device.

In addition, the third locking means, which includes the components 119a and 119b, can stably hold the first protective plate 107a, and the fourth locking means, which includes the components 121a and 121b, can stably hold the second protective plate 107b. These locking means can therefore improve the reliability of the device.

In addition, the first to fourth locking means are not unlocked when a human hand does not touch the capacitive sensor 117 or the pushbutton switch 112 is not pressed. This allows for the prevention of an accidental change of the overall form from the portrait-oriented form to the landscape-oriented form or from the landscape-oriented form to the portrait-oriented form, thus improving the reliability of the device.

In addition, the band 118 secures a human hand inserted between the back surface of the second casing 102 and the band 118 to maintain the overall device in a stable state, thereby improving the ease of the individual operations. Even if a conductor other than a hand is brought close to the capacitive sensor 117 and is pressed against the band 118 for some reason, the band 118 prevents the conductor from coming into contact with the capacitive sensor 117. That is, the band 118 can prevent malfunctions to improve the reliability of the device.

Though the first and second casings 101 and 102, which include the first and second display portions 103 and 110, each have an aspect ratio of 3:2 in the above embodiment, they may also have an aspect ratio of 9:8. In this case, the first display portion 103 can form a portrait-oriented liquid crystal screen having a length slightly larger than the width thereof in the cellular phone mode. In the television/Internet receiver mode, on the other hand, the first and second display portions 103 and 110 can form a combined landscape-oriented liquid crystal screen having an aspect ratio of 9:16, which is suitable for television and the Internet.

In the third embodiment, the first and second casings have long sides and short sides and are formed in such a shape that a long side of the first casing can be brought into contact with a long side of the second casing and a short side of the first casing can be brought into contact with a short side of the second casing. Accordingly, for example, any portions of the first and second casings other than the long sides and the short sides thereof may be curved. In addition, the first and second casings 101 and 102 may also be square as long as the display portions 103 and 110 are rectangular.

The present invention is not limited to the above embodiments, and various modifications are permitted within the scope of the present invention.

The present invention can provide a highly portable electronic device including foldable display units. In addition, screen display portions of the display units can be combined to form a single, larger-screen display portion. That is, the electronic device can provide portability and usability comparable to known cellular phones and a display portion with a large screen comparable to liquid crystal television receivers and PDAs.

Another electronic device according to the present invention can form a portrait-oriented screen suitable as a cellular phone and a landscape-oriented screen suitable for television and the Internet with no dead area (area that does not contribute to screen display). This electronic device can therefore readily provide two different screens with conventionally desired aspect ratios.

The invention claimed is:

1. An electronic device comprising a display including:
   a first display unit having a first display portion;
   a second display unit having a second display portion; and
   coupling means, provided between the first and second display units, for freely changing the mode of the display among a first mode in which the first and second display portions are folded so as to face each other, a second mode in which the first and second display units are opened such that the first and second display portions are arranged longitudinally, and a third mode in which the first and second display units are opened such that the first and second display portions are adjacent to each other laterally,
   wherein the coupling means includes one or two coupling shafts for folding the coupling means in two or three; and rotating shafts are provided between the coupling means and the first display unit and between the coupling means and the second display unit to support the first and second display units rotatably with respect to the coupling means, and
   wherein planes containing the axes of either the coupling shafts or the rotating shafts are perpendicular to the axes of the other shafts.

2. The electronic device comprising the display according to claim 1, wherein the rotating shafts are provided on either the coupling means or the first and second display units; and holding holes for holding the rotating shafts are provided on the other.

3. The electronic device comprising the display according to claim 2, wherein the rotating shafts each have a narrow main portion and a wide portion integrally formed with an end of the narrow portion; and the holding holes each have a rotation-permitting portion that permits the rotation of the narrow portion and an elongated hole portion integrally formed with the rotation-permitting portion to permit the sliding movement of the narrow portion.

4. The electronic device comprising the display according to claim 1, wherein at least one of the first and second display portions includes a transparent touch panel.

5. The electronic device comprising the display according to claim 1, wherein the first and second display units each include an RF unit for communicating data information therebetween using a radio wave.

6. The electronic device comprising the display according to claim 1, wherein the peripheries of the first and second display portions are protected by frames; sides of the frames which are adjacent to each other in the third mode are supported rotatably with respect to other portions of the frames; and the first and second display portions form a single display portion with the sides rotated.

7. The electronic device according to claim 1, being a portable information terminal.

8. An electronic device comprising:
   a first rectangular casing including a first display portion;
   a second rectangular casing including a second display portion;
   first securing means for securing the first and second casings with predetermined short sides thereof being in contact with each other;
   second securing means for securing the first and second casings with predetermined long sides thereof being in contact with each other;
   a first protective plate for protecting the first display portion;
   a first rotating portion for attaching the first protective plate to the predetermined long side of the first casing rotatably with respect to the first casing;
   a second protective plate for protecting the second display portion;
   a second rotating portion for attaching the second protective plate to the predetermined long side of the second casing rotatably with respect to the second casing;
   first locking means for locking the first protective plate such that the first protective plate extends from the first casing laterally; and
   second locking means for locking the second protective plate such that the second protective plate extends from the second casing laterally.

9. The electronic device according to claim 8, further comprising a first rotating portion for rotatably connecting the first and second casings, wherein
   the first rotating portion accommodates wiring connecting electrical systems of the first and second casings;
   the first display portion of the first casing and the second display portion of the second casing are provided so that the display portions are arrangeable in the same plane; and
   the first and second casings are relatively rotatable about the first rotating portion in a predetermined plane.

10. The electronic device according to claim 8, having a cellular phone function and a television or Internet receiver function, wherein
    a cellular phone is formed when the first securing means secures the predetermined short sides of the first and second casings; and
    a television or Internet receiver is formed when the second securing means secures the predetermined long sides of the first and second casings.

11. The electronic device according to claim 10, wherein the first and second casings have the same aspect ratio, the aspect ratio being 3:2 or 9:8.

12. The electronic device according to claim 11, wherein the second display portion of the second casing forms an input part when the electronic device is used as a cellular phone.

13. The electronic device according to claim 12, wherein
the first securing means comprises first locking means for locking the first and second casings with the predetermined short sides thereof being in contact with each other; and the second securing means comprises second locking means for locking the first and second casings with the predetermined long sides thereof being, in contact with each other.

14. The electronic device according to claim 8, further comprising a capacitive sensor disposed on the back surface of the second casing to output a signal related to the unlocking of the first and second locking means.

15. The electronic device according to claim 14, further comprising an insulating band disposed on the back surface of the second casing to cover the capacitive sensor and secure a human hand inserted between the band and the second casing.

16. The electronic device according to claim 8, being a portable information terminal.

* * * * *